(12) United States Patent
Hattori et al.

(10) Patent No.: US 11,855,400 B2
(45) Date of Patent: Dec. 26, 2023

(54) CONNECTION STRUCTURE OF SUPERCONDUCTING LAYER, SUPERCONDUCTING WIRE, SUPERCONDUCTING COIL, AND SUPERCONDUCTING DEVICE

(71) Applicants: KABUSHIKI KAISHA TOSHIBA, Tokyo (JP); TOSHIBA ENERGY SYSTEMS & SOLUTIONS CORPORATION, Kawasaki (JP)

(72) Inventors: Yasushi Hattori, Kawasaki Kanagawa (JP); Tomoko Eguchi, Yokohama Kanagawa (JP); Masaya Hagiwara, Yokohama Kanagawa (JP); Keiko Albessard, Yokohama Kanagawa (JP)

(73) Assignees: Kabushiki Kaisha Toshiba, Tokyo (JP); Toshiba Energy Systems & Solutions Corporation, Kawasaki (JP)

( * ) Notice: Subject to any disclaimer, the term of this patent is extended or adjusted under 35 U.S.C. 154(b) by 280 days.

(21) Appl. No.: 17/466,981

(22) Filed: Sep. 3, 2021

(65) Prior Publication Data
US 2022/0302609 A1  Sep. 22, 2022

(30) Foreign Application Priority Data
Mar. 19, 2021  (JP) ................. 2021-046286

(51) Int. Cl.
*H01R 4/00* (2006.01)
*H01R 4/68* (2006.01)
(Continued)

(52) U.S. Cl.
CPC ............... *H01R 4/68* (2013.01); *H01B 12/06* (2013.01); *H02G 15/34* (2013.01)

(58) Field of Classification Search
CPC ........... H01R 4/68; H01B 12/06; H02G 15/34
See application file for complete search history.

(56) References Cited

U.S. PATENT DOCUMENTS

2018/0226730 A1* 8/2018 Fietz ....................... H01R 4/187
2018/0261932 A1* 9/2018 Tuckerman ............... H01R 4/48
(Continued)

FOREIGN PATENT DOCUMENTS

JP  2016-201328 A  12/2016
JP  6258775 B2  1/2018
(Continued)

*Primary Examiner* — Pete T Lee
(74) *Attorney, Agent, or Firm* — Finnegan, Henderson, Farabow, Garrett & Dunner, LLP

(57) ABSTRACT

A connection structure of a superconducting layer of an embodiment incudes a first superconducting member including a first superconducting layer, and extends in a first direction, a second superconducting member including a second superconducting layer facing the first superconducting layer, and extends in the first direction, the second superconducting member having a first region, a second region, and a third region which is separated in the second direction from the second region, and a connection layer that contains a rare earth element (RE), barium (Ba), copper (Cu), and oxygen (O), and connects the first superconducting layer and the second superconducting layer. The first superconducting layer is present in a third direction between the second region and the third region, the third direction being perpendicular to the first direction and perpendicular to the second direction.

21 Claims, 25 Drawing Sheets

(51) Int. Cl.
*H02G 15/34* (2006.01)
*H01B 12/06* (2006.01)

(56) References Cited

U.S. PATENT DOCUMENTS

| | | | |
|---|---|---|---|
| 2019/0181326 A1* | 6/2019 | Deutscher | H10N 60/0408 |
| 2019/0379145 A1 | 12/2019 | Yamano et al. | |
| 2022/0199887 A1 | 6/2022 | Hagiwara et al. | |

FOREIGN PATENT DOCUMENTS

| | | |
|---|---|---|
| JP | 6356048 B2 | 7/2018 |
| JP | 2018-142409 A | 9/2018 |
| JP | 2020-61255 A | 4/2020 |
| JP | 2022-41667 A | 3/2022 |
| WO | WO 2022/049800 A1 | 3/2022 |

* cited by examiner

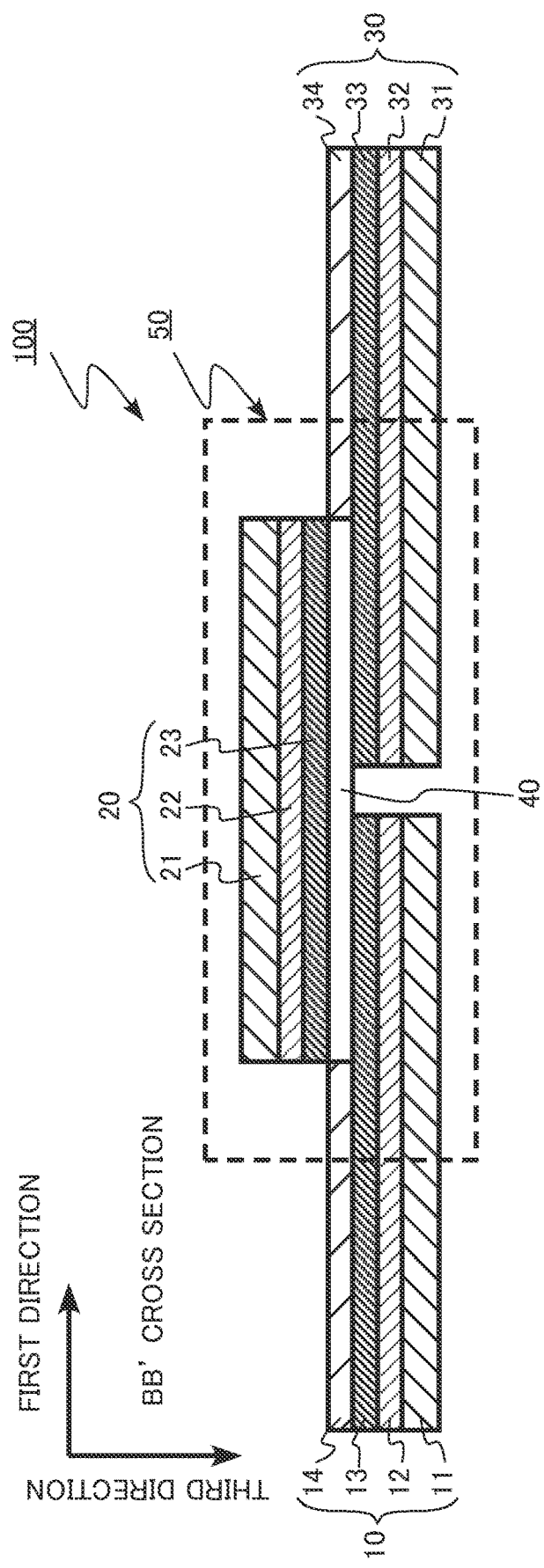

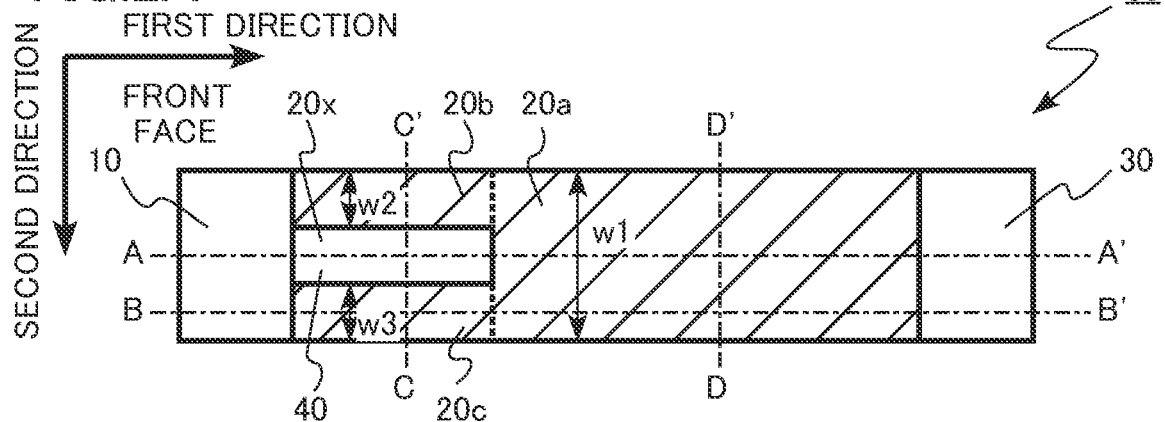
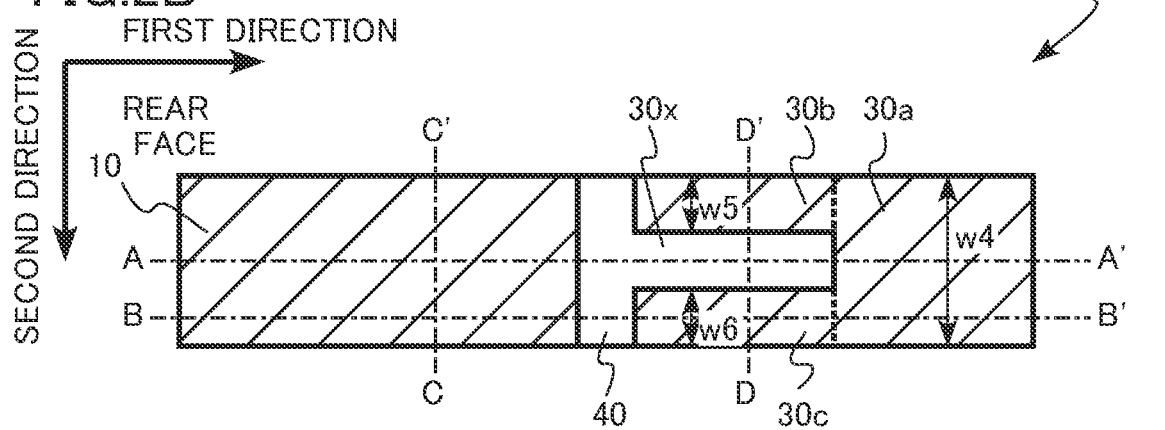
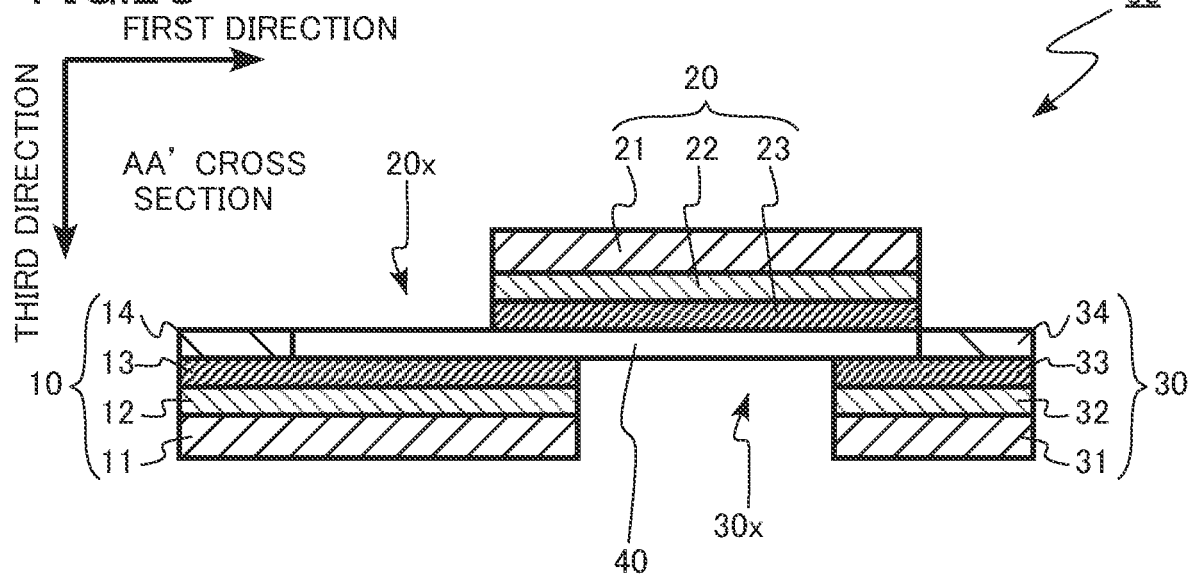

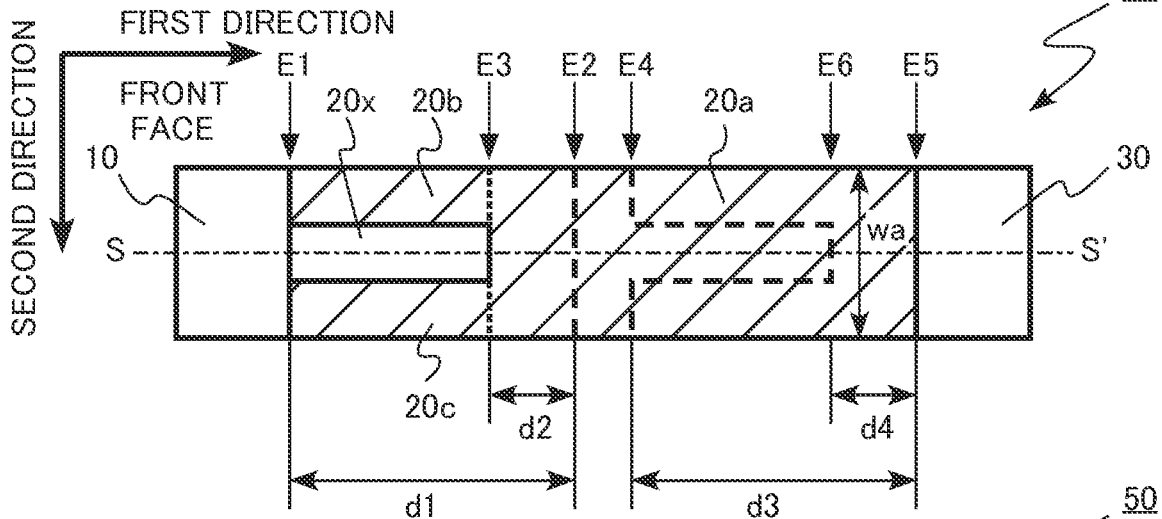
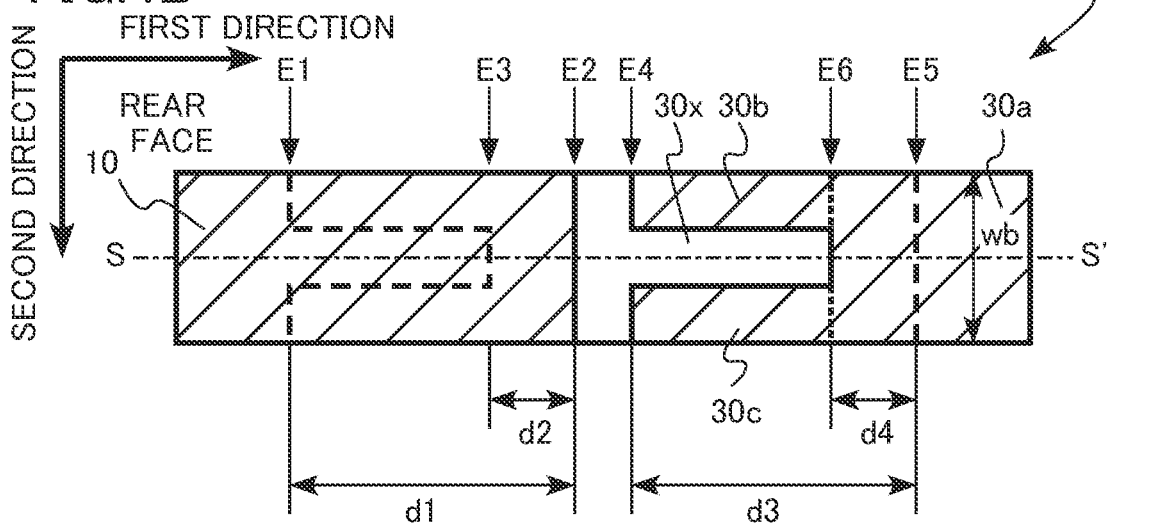
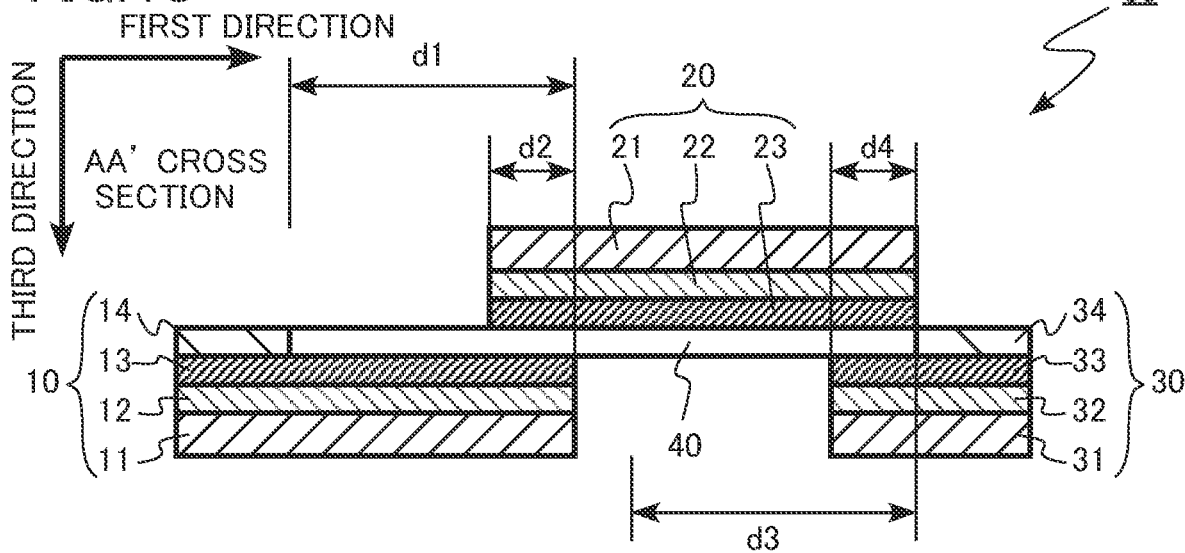

FIG.5
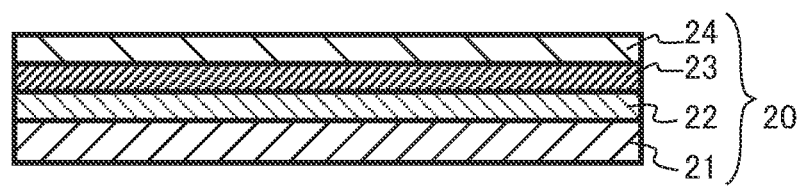
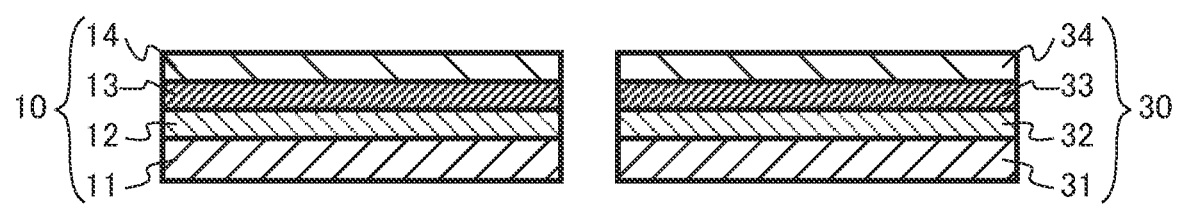

FIG.6
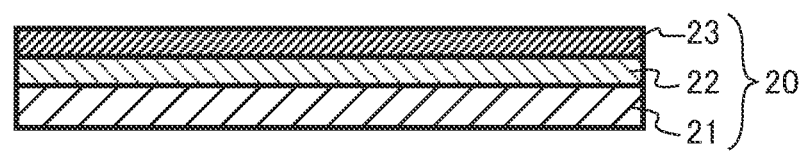
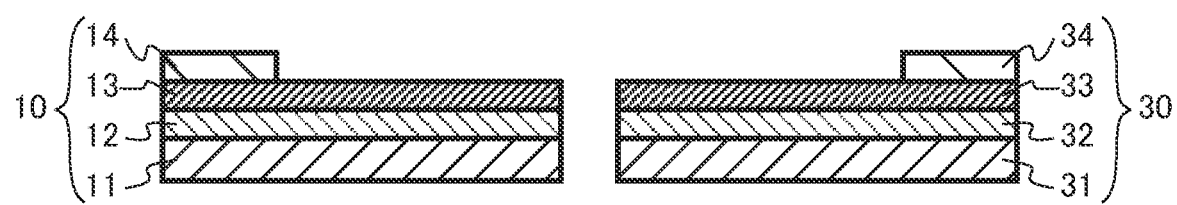

FIG.7
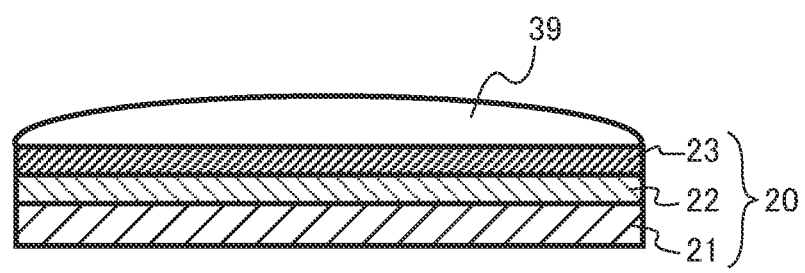
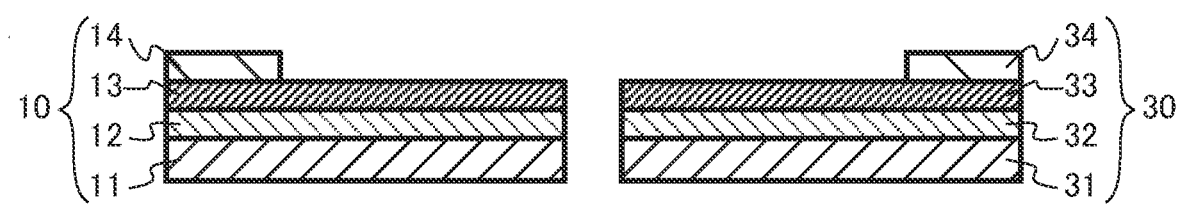

FIG.8
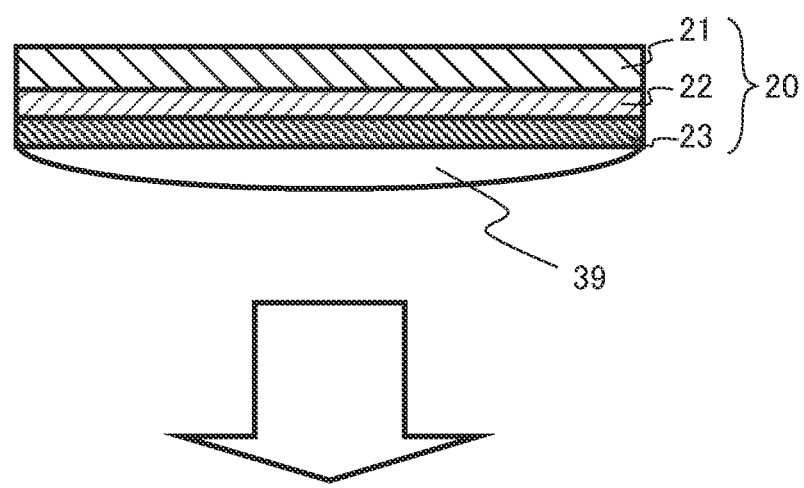
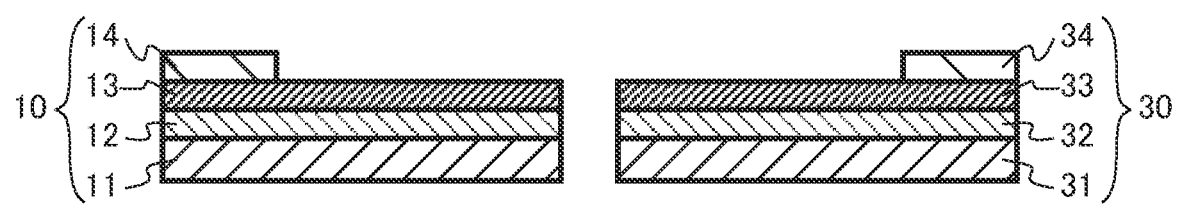

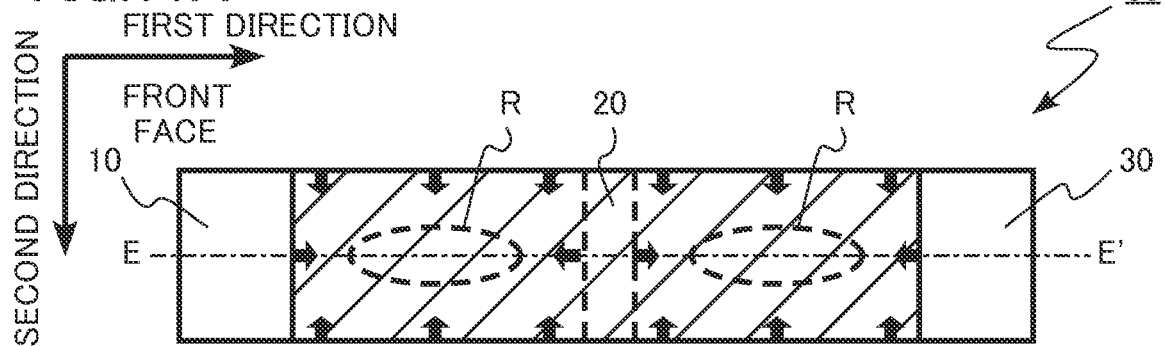
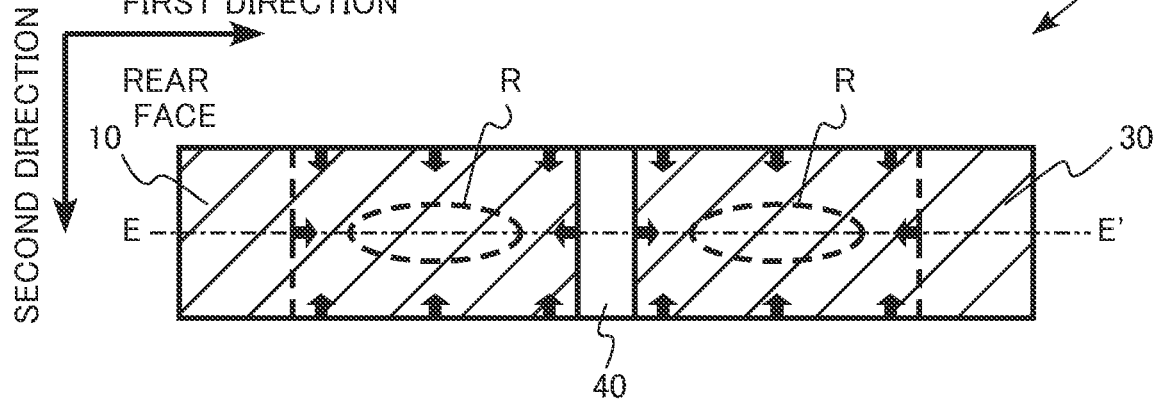
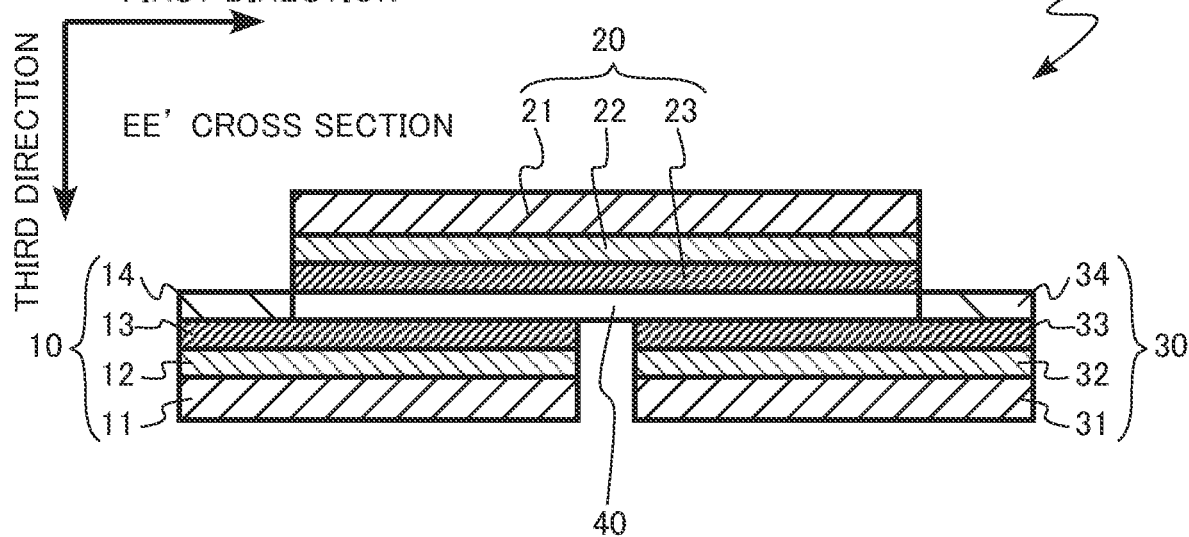

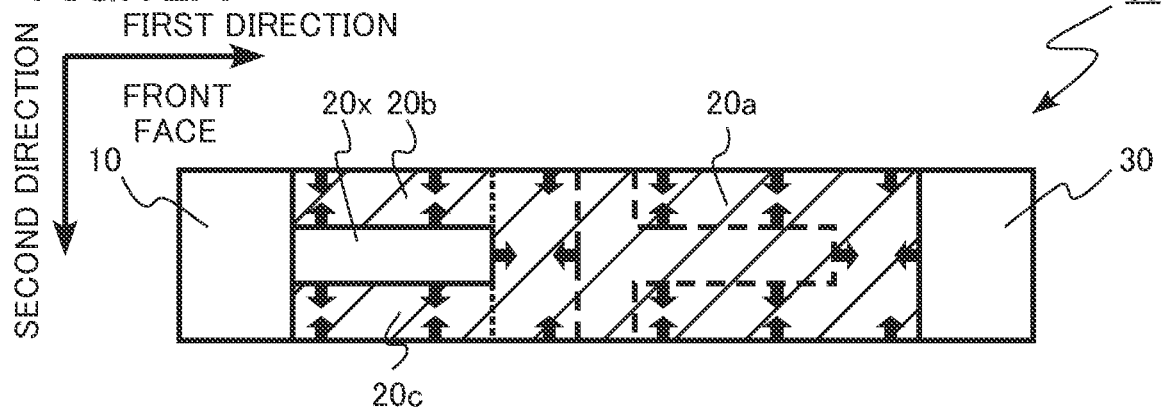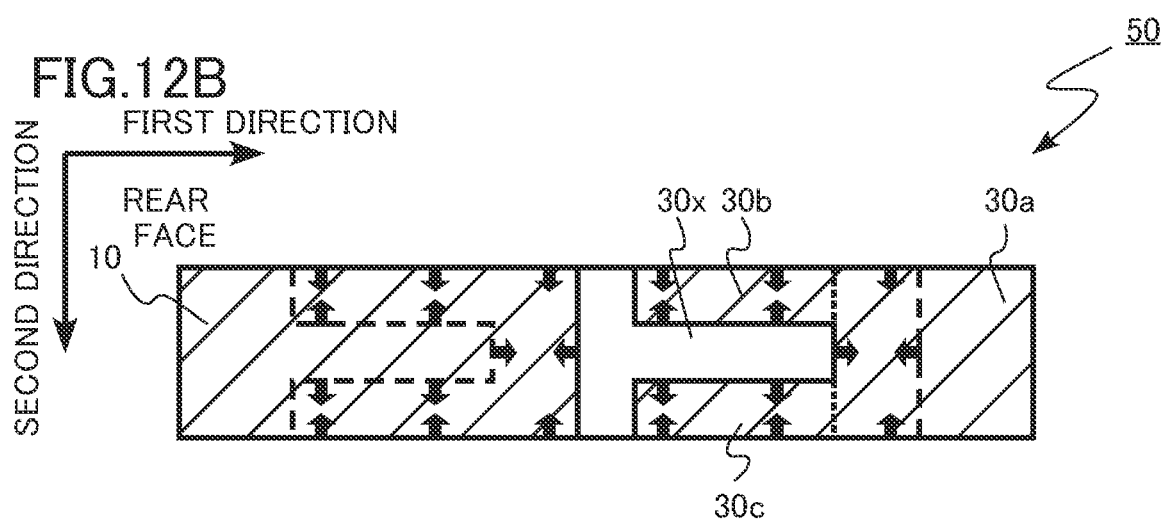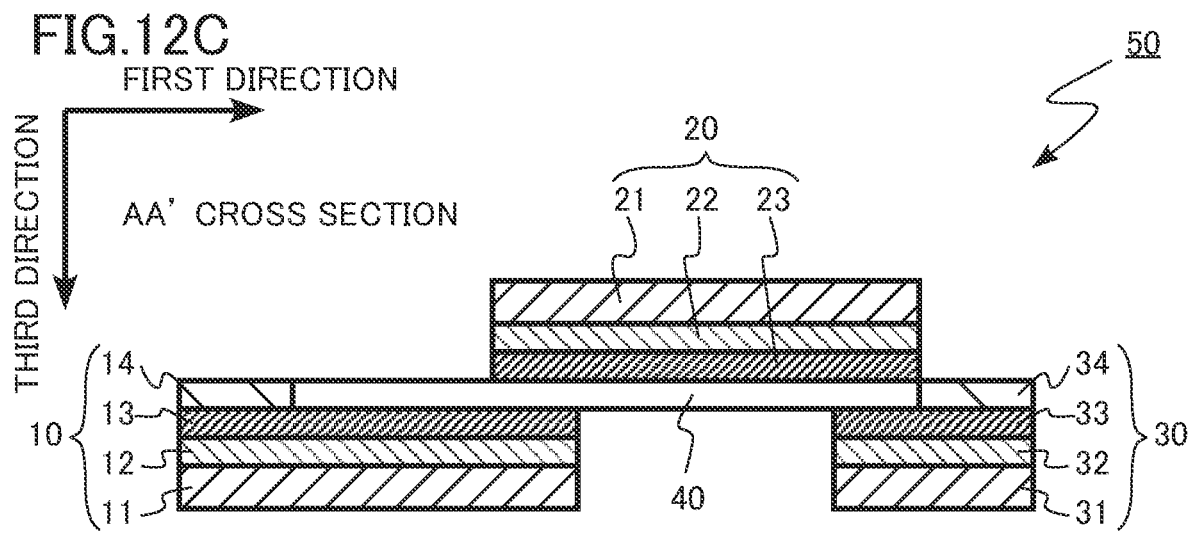

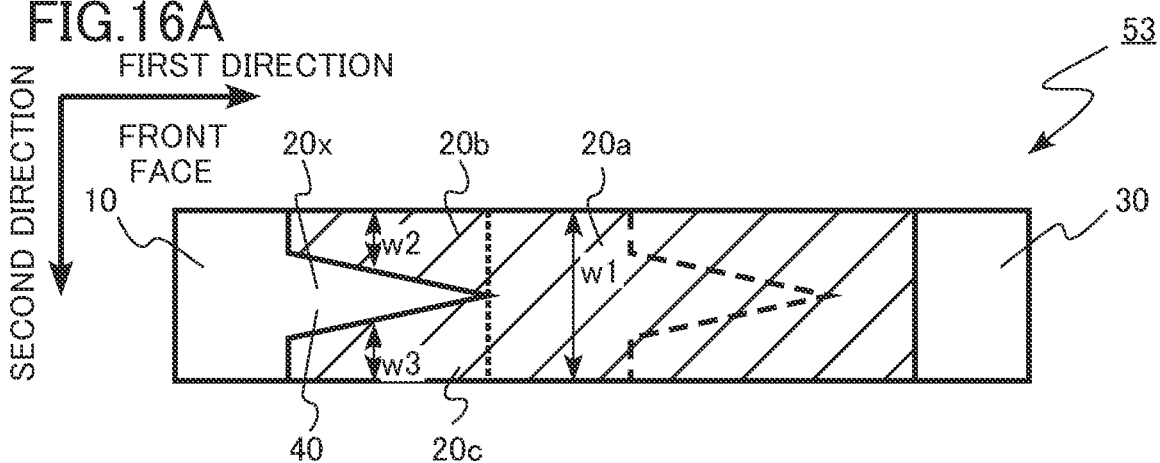
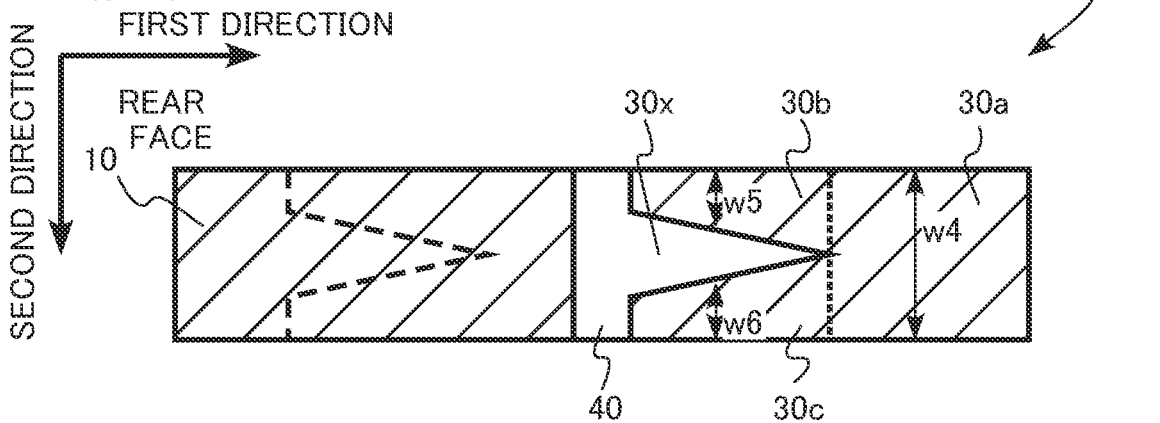

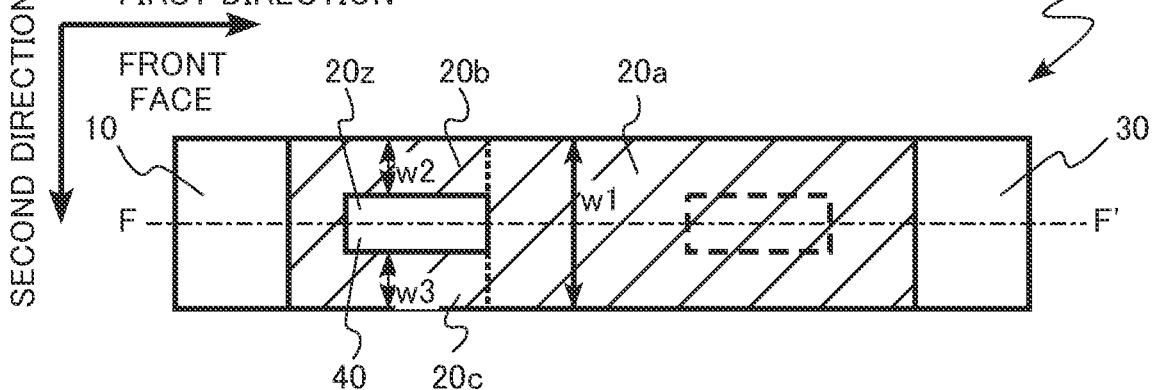
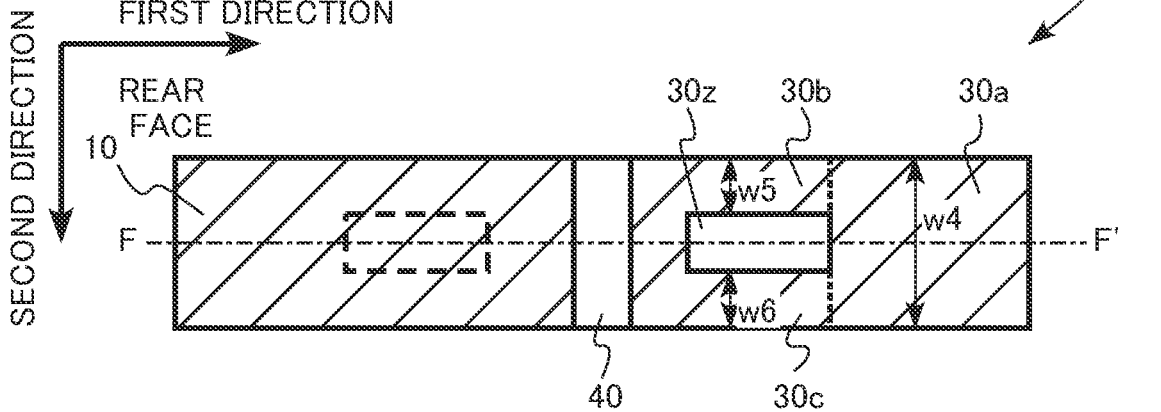
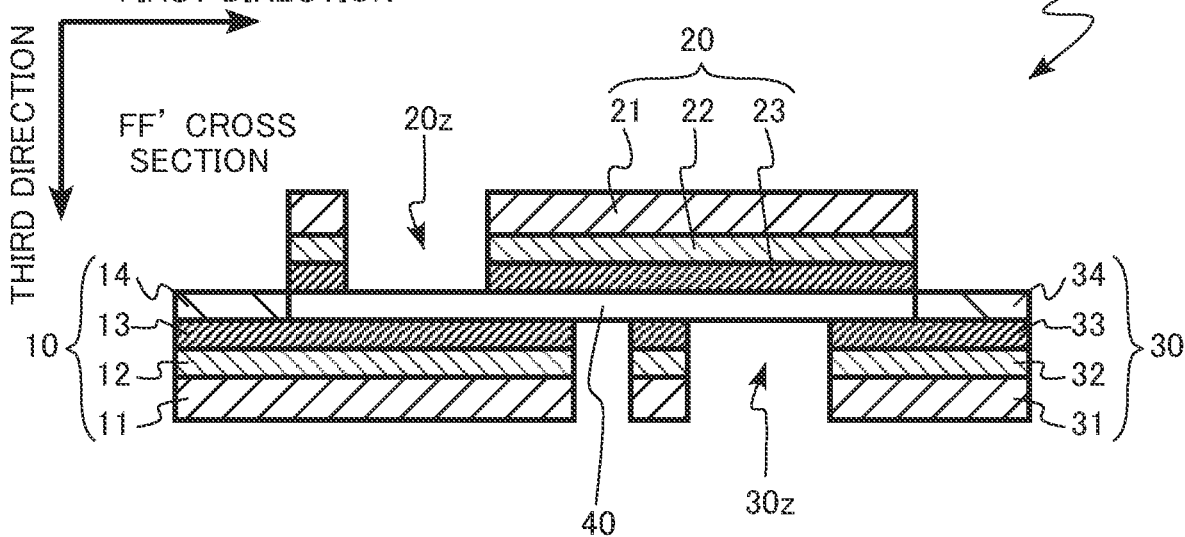

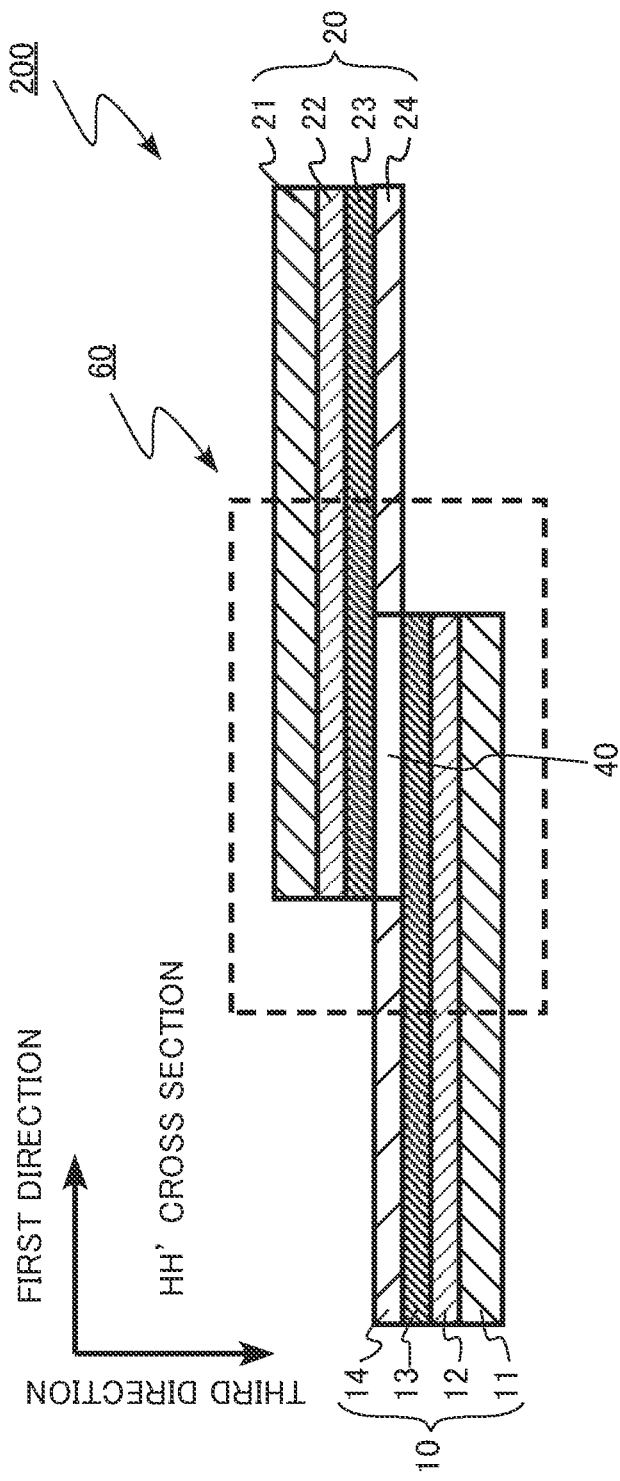

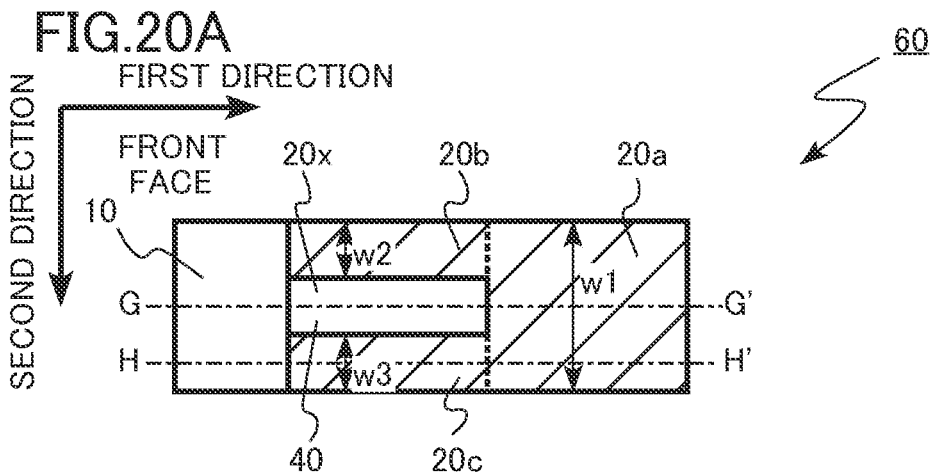
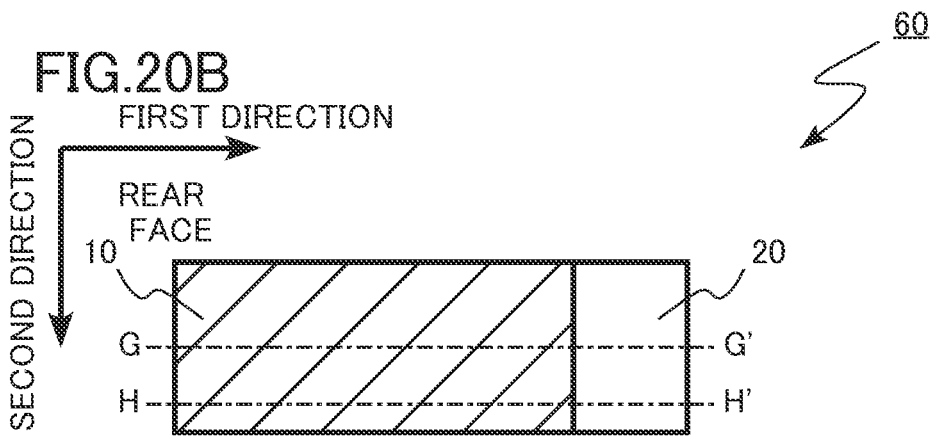
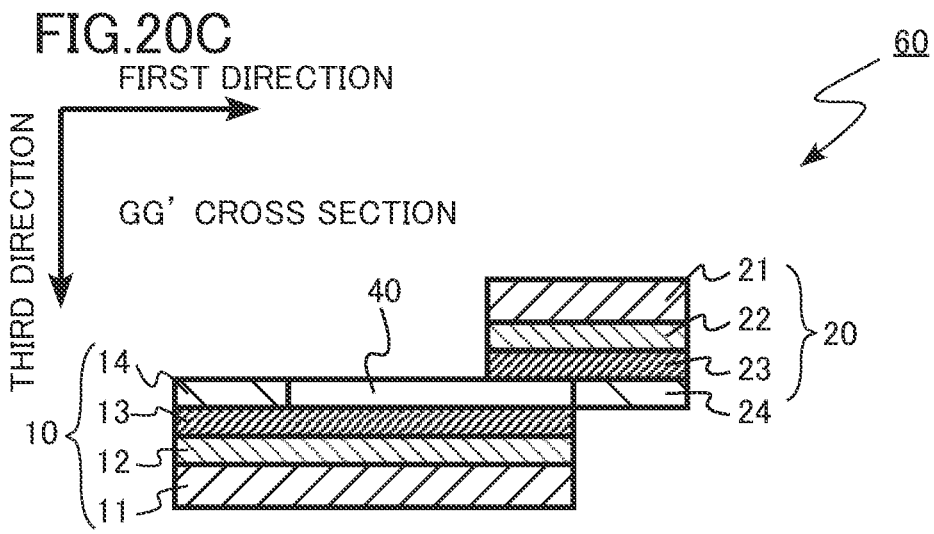

CONNECTION STRUCTURE OF SUPERCONDUCTING LAYER, SUPERCONDUCTING WIRE, SUPERCONDUCTING COIL, AND SUPERCONDUCTING DEVICE

CROSS-REFERENCE TO RELATED APPLICATION

This application is based upon and claims the benefit of priority from Japanese Patent Application No. 2021-046286, filed on Mar. 19, 2021, the entire contents of which are incorporated herein by reference.

FIELD

Embodiments described herein relate generally to a connection structure of a superconducting layer, a superconducting wire, a superconducting coil, and a superconducting device.

BACKGROUND

For example, in a nuclear magnetic resonance apparatus (NMR) or a magnetic resonance imaging apparatus (MRI), a superconducting coil is used to generate a strong magnetic field. The superconducting coil is formed by winding a superconducting wire around a winding frame.

In order to lengthen the superconducting wire, for example, a plurality of superconducting wires is connected. For example, ends of two superconducting wires are connected by using a connection structure. The connection structure for connecting the superconducting wires is required to have low electric resistance and high mechanical strength.

BRIEF DESCRIPTION OF THE DRAWINGS

FIG. 1 is a schematic cross-sectional view of a superconducting wire of a first embodiment;

FIGS. 2A, 2B, and 2C are schematic plan views and a schematic cross-sectional view of a connection structure of a superconducting layer of the first embodiment;

FIGS. 4A, 4B, and 4C are explanatory diagrams of the connection structure of a superconducting layer of the first embodiment;

FIG. 5 is an explanatory diagram of preparation of a first superconducting wire, a second superconducting wire, and a third superconducting wire in a method for connecting a superconducting layer of the first embodiment;

FIG. 6 is an explanatory diagram of removal of a first protective layer, a second protective layer, and a third protective layer in the method for connecting the superconducting layer of the first embodiment;

FIG. 7 is an explanatory diagram of application of a slurry onto the second superconducting layer in the method for connecting the superconducting layer of the first embodiment;

FIG. 8 is an explanatory diagram of a state in which the first superconducting layer faces the second superconducting layer and the third superconducting layer faces the second superconducting layer in the method for connecting the superconducting layer of the first embodiment;

FIGS. 11A, 11B, and 11C are schematic diagrams of a connection structure of a superconducting layer of a comparative example;

FIGS. 12A, 12B, and 12C are explanatory diagrams of an oxygen supply effect of the connection structure of a superconducting layer of the first embodiment;

FIGS. 16A and 16B are schematic plan views of a modification example of the connection structure of a superconducting layer of the second embodiment;

FIGS. 18A, 18B, and 18C are schematic plan views and a schematic cross-sectional view of a connection structure of a superconducting layer of a fourth embodiment;

FIG. 19 is a schematic cross-sectional view of a connection structure of a superconducting layer of a fifth embodiment;

FIGS. 20A, 20B, and 20C are schematic plan views and a schematic cross-sectional view of the connection structure of a superconducting layer of the fifth embodiment;

DETAILED DESCRIPTION

Figure 3A:
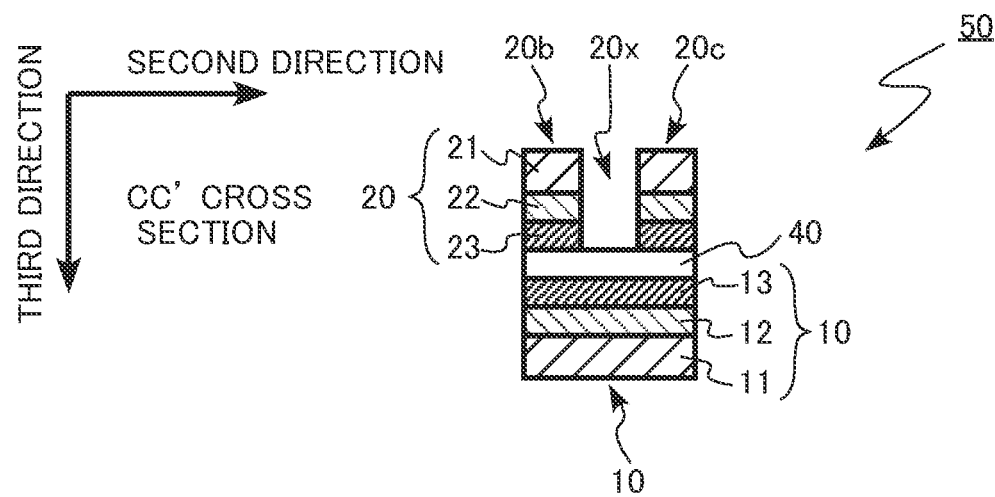
FIGS. 3A and 3B are schematic cross-sectional views of the connection structure of a superconducting layer of the first embodiment.

A connection structure of a superconducting layer includes a first superconducting member including a first superconducting layer and a first substrate, the first substrate supporting the first superconducting layer, and the first superconducting member extending in a first direction; a second superconducting member including a second superconducting layer and a second substrate, the second superconducting layer facing the first superconducting layer, the second substrate supporting the second superconducting layer, the second superconducting member extending in the first direction, the second superconducting member having a first region, a second region, and a third region, a width of the first region in a second direction perpendicular to the first direction being a first width, a width of the second region in the second direction being a second width, a width of the third region in the second direction is a third width, the third region being separated in the second direction from the second region, the second width being smaller than the first width, the third width being smaller than the first width, an end of the second region in the first direction being in contact with the first region, an end of the third region in the first direction being in contact with the first region; and a connection layer containing a rare earth element (RE), barium (Ba), copper (Cu), and oxygen (O), and the connection layer connecting the first superconducting layer and the second superconducting layer. The first superconducting layer is present in a third direction of a portion between the second region and the third region, the first superconducting layer is not present at the portion, and the third direction is perpendicular to the first direction and perpendicular to the second direction.

Hereinafter, embodiments of the present disclosure will be described with reference to the drawings. In the following description, the same or similar members or the like will be denoted by the same reference numerals, and the description of the members once described or the like may be appropriately omitted.

In the present specification, detection of an element contained in a crystal or the like and measurement of an atomic concentration of the element can be performed by using, for example, energy dispersive X-ray spectroscopy (EDX) or wavelength dispersive X-ray spectroscopy (WDX). A substance contained in particles or the like can be identified by using, for example, powder X-ray diffractometry.

First Embodiment

A connection structure of a superconducting layer of a first embodiment includes a first superconducting member including a first superconducting layer and a first substrate, the first substrate supporting the first superconducting layer, and the first superconducting member extending in a first direction; a second superconducting member including a second superconducting layer and a second substrate, the second superconducting layer facing the first superconducting layer, the second substrate supporting the second superconducting layer, the second superconducting member extending in the first direction, the second superconducting member having a first region, a second region, and a third region, a width of the first region in a second direction perpendicular to the first direction being a first width, a width of the second region in the second direction being a second width, a width of the third region in the second direction is a third width, the third region being separated in the second direction from the second region, the second width being smaller than the first width, the third width being smaller than the first width, an end of the second region in the first direction being in contact with the first region, an end of the third region in the first direction being in contact with the first region; and a connection layer containing a rare earth element (RE), barium (Ba), copper (Cu), and oxygen (O), and the connection layer connecting the first superconducting layer and the second superconducting layer. The first superconducting layer is present in a third direction of a portion between the second region and the third region, the first superconducting layer is not present at the portion, and the third direction is perpendicular to the first direction and perpendicular to the second direction.

The superconducting wire of the first embodiment includes the connection structure of a superconducting layer of the first embodiment.

FIG. 1 is a schematic cross-sectional view of a superconducting wire of the first embodiment. A superconducting wire 100 of the first embodiment includes a first superconducting wire 10, a second superconducting wire 20, and a third superconducting wire 30.

The first superconducting wire 10 is an example of a first superconducting member. The second superconducting wire 20 is an example of a second superconducting member. The third superconducting wire 30 is an example of a third superconducting member.

The first superconducting wire 10 extends in the first direction. The second superconducting wire 20 extends in the first direction. The third superconducting wire 30 extends in the first direction. The superconducting wire 100 of the first embodiment is elongated in the first direction by connecting the first superconducting wire 10 and the third superconducting wire 30 by using the second superconducting wire 20.

For example, a length of the second superconducting wire 20 in the first direction is shorter than a length of the first superconducting wire 10 in the first direction. For example, the length of the second superconducting wire 20 in the first direction is shorter than a length of the third superconducting wire 30 in the first direction. The second superconducting wire 20 functions as a connection member that connects the first superconducting wire 10 and the third superconducting wire 30.

The superconducting wire 100 of the first embodiment includes a connection structure 50. In the connection structure 50, the first superconducting wire 10 and the second superconducting wire 20 are connected. In the connection structure 50, the second superconducting wire 20 and the third superconducting wire 30 are connected.

The first superconducting wire 10 includes a first substrate 11, a first intermediate layer 12, a first superconducting layer 13, and a first protective layer 14. The second superconducting wire 20 includes a second substrate 21, a second intermediate layer 22, and a second superconducting layer 23. The third superconducting wire 30 includes a third substrate 31, a third intermediate layer 32, a third superconducting layer 33, and a third protective layer 34.

The first substrate 11 is, for example, metal. The first substrate 11 is, for example, a nickel alloy or a copper alloy. The first substrate 11 is, for example, a nickel-tungsten alloy.

The first superconducting layer 13 is, for example, an oxide superconducting layer. The first superconducting layer 13 contains, for example, a rare earth element (RE), barium (Ba), copper (Cu), and oxygen (O). The first superconducting layer 13 is, for example, an oxide superconducting layer. The first superconducting layer 13 contains, for example, a crystal containing a rare earth element (RE), barium (Ba), copper (Cu), and oxygen (O). The first superconducting layer 13 contains, for example, at least one rare earth element (RE) selected from the group consisting of yttrium (Y), lanthanum (La), neodymium (Nd), samarium (Sm), europium (Eu), gadolinium (Gd), terbium (Tb), dysprosium (Dy), holmium (Ho), erbium (Er), thulium (Tm), ytterbium (Yb), and lutetium (Lu).

The first superconducting layer 13 includes, for example, a single crystal having a perovskite structure.

The first superconducting layer 13 is formed on the first intermediate layer 12 by using, for example, a metal organic decomposition method (MOD method), a pulse laser deposition method (PLD method), or a metal organic chemical vapor deposition method (MOCVD method).

The first intermediate layer 12 is provided between the first substrate 11 and the first superconducting layer 13. The first intermediate layer 12 is in contact with, for example, the first superconducting layer 13. The first intermediate layer 12 has a function of improving a crystal orientation of the first superconducting layer 13 formed on the first intermediate layer 12.

The first intermediate layer 12 contains, for example, a rare earth oxide. The first intermediate layer 12 has, for example, a stacked structure of a plurality of films. The first intermediate layer 12 has, for example, a structure in which an yttrium oxide ($Y_2O_3$), yttria-stabilized zirconia (YSZ), and a cerium oxide ($CeO_2$) are stacked from the first substrate 11 side.

The first protective layer 14 is provided on the first superconducting layer 13. The first protective layer 14 is in contact with, for example, the first superconducting layer 13. The first protective layer 14 has a function of protecting the first superconducting layer 13.

The first protective layer 14 is, for example, metal, and the first protective layer 14 contains, for example, silver (Ag) or copper (Cu).

The second substrate 21 is, for example, metal. The second substrate 21 is, for example, a nickel alloy or a copper alloy. The second substrate 21 is, for example, a nickel-tungsten alloy.

The second superconducting layer 23 faces the first superconducting layer 13. The second superconducting layer 23 is, for example, an oxide superconducting layer. The second superconducting layer 23 contains, for example, a rare earth element (RE), barium (Ba), copper (Cu), and oxygen (O). The second superconducting layer 23 contains, for example, a crystal containing a rare earth element (RE), barium (Ba), copper (Cu), and oxygen (O). The second superconducting layer 23 contains, for example, at least one rare earth element (RE) selected from the group consisting of yttrium (Y), lanthanum (La), neodymium (Nd), samarium (Sm), europium (Eu), gadolinium (Gd), terbium (Tb), dysprosium (Dy), holmium (Ho), erbium (Er), thulium (Tm), ytterbium (Yb), and lutetium (Lu).

The second superconducting layer 23 includes, for example, a single crystal having a perovskite structure.

The second superconducting layer 23 is formed on the second intermediate layer 22 by using, for example, the MOD method, the PLD method, or the MOCVD method.

The second intermediate layer 22 is provided between the second substrate 21 and the second superconducting layer 23. The second intermediate layer 22 is in contact with, for example, the second superconducting layer 23. The second intermediate layer 22 has a function of improving a crystal orientation of the second superconducting layer 23 formed on the second intermediate layer 22.

The second intermediate layer 22 contains, for example, a rare earth oxide. The second intermediate layer 22 has, for example, a stacked structure of a plurality of films. The second intermediate layer 22 has, for example, a structure in which an yttrium oxide ($Y_2O_3$), yttria-stabilized zirconia (YSZ), and a cerium oxide ($CeO_2$) are stacked from the second substrate 21 side.

The third substrate 31 is, for example, metal. The third substrate 31 is, for example, a nickel alloy or a copper alloy. The third substrate 31 is, for example, a nickel-tungsten alloy.

The third superconducting layer 33 faces the second superconducting layer 23. The third superconducting layer 33 is, for example, an oxide superconducting layer. The third superconducting layer 33 contains, for example, a rare earth element (RE), barium (Ba), copper (Cu), and oxygen (O). The third superconducting layer 33 contains, for example, a crystal containing a rare earth element (RE), barium (Ba), copper (Cu), and oxygen (O). The third superconducting layer 33 contains, for example, at least one rare earth element (RE) selected from the group consisting of yttrium (Y), lanthanum (La), neodymium (Nd), samarium (Sm), europium (Eu), gadolinium (Gd), terbium (Tb), dysprosium (Dy), holmium (Ho), erbium (Er), thulium (Tm), ytterbium (Yb), and lutetium (Lu).

The third superconducting layer 33 includes, for example, a single crystal having a perovskite structure.

The third superconducting layer 33 is formed on the third intermediate layer 32 by, for example, the MOD method, the PLD method, or the MOCVD method.

The third intermediate layer 32 is provided between the third substrate 31 and the third superconducting layer 33. The third intermediate layer 32 is in contact with, for example, the third superconducting layer 33. The third intermediate layer 32 has a function of improving a crystal orientation of the third superconducting layer 33 formed on the third intermediate layer 32.

The third intermediate layer 32 contains, for example, a rare earth oxide. The third intermediate layer 32 has, for example, a stacked structure of a plurality of films. The third intermediate layer 32 has, for example, a structure in which an yttrium oxide ($Y_2O_3$), yttria-stabilized zirconia (YSZ), and a cerium oxide ($CeO_2$) are stacked from the third substrate 31 side.

The third protective layer 34 is provided on the third superconducting layer 33. The third protective layer 34 is in contact with, for example, the third superconducting layer 33. The third protective layer 34 has a function of protecting the third superconducting layer 33.

The third protective layer 34 is, for example, metal, and the third protective layer 34 contains, for example, silver (Ag) or copper (Cu).

A connection layer 40 is provided between the first superconducting layer 13 and the second superconducting layer 23. The connection layer 40 is in contact with the first superconducting layer 13. The connection layer 40 is in contact with the second superconducting layer 23. The connection layer 40 connects the first superconducting layer 13 and the second superconducting layer 23.

The connection layer 40 is provided between the second superconducting layer 23 and the third superconducting layer 33. The connection layer 40 is in contact with the second superconducting layer 23. The connection layer 40 is in contact with the third superconducting layer 33. The connection layer 40 connects the second superconducting layer 23 and the third superconducting layer 33.

The connection layer 40 between the first superconducting layer 13 and the second superconducting layer 23 and the connection layer 40 between the second superconducting layer 23 and the third superconducting layer 33 are continuous, for example. The connection layer 40 between the first superconducting layer 13 and the second superconducting layer 23 and the connection layer 40 between the second superconducting layer 23 and the third superconducting layer 33 may be separated, for example.

The connection layer 40 is not present, for example, between the first superconducting layer 13 and the third superconducting layer 33. For example, there is a gap (air gap) between the first superconducting layer 13 and the third superconducting layer 33.

The connection layer 40 is an oxide superconducting layer. The connection layer 40 includes a superconductor.

The connection layer 40 contains a rare earth element (RE), barium (Ba), copper (Cu), and oxygen (O). The connection layer 40 contains, for example, a crystal containing a rare earth element (RE), barium (Ba), copper (Cu), and oxygen (O). The crystal is a rare earth oxide. The crystal is, for example, a single crystal or a polycrystal having a perovskite structure. The crystal has, for example, a chemical composition represented by $(RE)Ba_2Cu_3O_\delta$ (RE is a rare earth element, $6 \leq \delta \leq 7$).

The connection layer 40 contains, for example, at least one rare earth element (RE) selected from the group consisting of yttrium (Y), lanthanum (La), neodymium (Nd), samarium (Sm), europium (Eu), gadolinium (Gd), terbium (Tb), dysprosium (Dy), holmium (Ho), erbium (Er), thulium (Tm), ytterbium (Yb), and lutetium (Lu).

FIGS. 2A, 2B, and 2C are schematic plan views and a schematic cross-sectional view of the connection structure of a superconducting layer of the first embodiment. FIG. 2A is a front view, FIG. 2B is a rear view, and FIG. 2C is a cross-sectional view taken along a line AA' of FIGS. 2A and 2B. FIG. 1 is a cross section including a BB' cross section in FIGS. 2A and 2B.

Figure 3B:
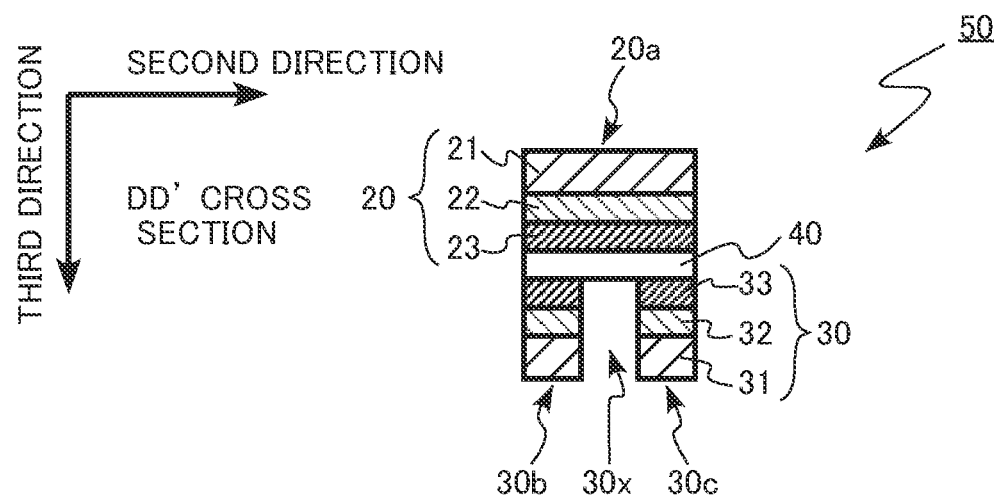

FIGS. 3A and 3B are schematic cross-sectional views of the connection structure of a superconducting layer of the first embodiment. FIG. 3A is a cross-sectional view taken along a line CC' in FIGS. 2A and 2B. FIG. 3B is a cross-sectional view taken along a line DD' of FIGS. 2A and 2B.

In FIG. 2A, only the second superconducting wire 20 is hatched. In FIG. 2B, only the first superconducting wire 10 and the third superconducting wire 30 are hatched.

A face of the superconducting wire 100 on a side on which the second superconducting wire 20 is provided is referred to as a front face, and an opposite face is referred to as a rear face.

A direction perpendicular to the first direction is defined as a second direction. A direction perpendicular to the first direction and perpendicular to the second direction is defined as a third direction.

The third superconducting wire 30 is disposed in the first direction of the first superconducting wire 10. The first superconducting wire 10 is disposed in the third direction of the second superconducting wire 20. The second superconducting wire 20 is disposed in a direction opposite to the third direction of the third superconducting wire 30.

The connection structure 50 of the first embodiment is a structure that physically and electrically connects the two superconducting layers.

The connection structure 50 includes the first superconducting wire 10, the second superconducting wire 20, the third superconducting wire 30, and the connection layer 40.

The first superconducting wire 10 is an example of a first superconducting member. The second superconducting wire 20 is an example of a second superconducting member. The third superconducting wire 30 is an example of a third superconducting member.

The first superconducting wire 10 includes a first substrate 11, a first intermediate layer 12, a first superconducting layer 13, and a first protective layer 14. The second superconducting wire 20 includes a second substrate 21, a second intermediate layer 22, and a second superconducting layer 23. The third superconducting wire 30 includes a third substrate 31, a third intermediate layer 32, a third superconducting layer 33, and a third protective layer 34.

The second superconducting wire 20 includes a wide region 20a, a first narrow region 20b, a second narrow region 20c, and a slit 20x.

The wide region 20a is an example of a first region. The first narrow region 20b is an example of a second region. The second narrow region 20c is an example of a third region. The slit 20x is an example of a portion between the second region and the third region.

A width of the wide region 20a in the second direction is a first width w1. A width of the first narrow region 20b in the second direction is a second width w2. A width of the second narrow region 20c in the second direction is a third width w3.

The second width w2 is smaller than the first width w1. The third width w3 is smaller than the first width w1.

An end of the first narrow region 20b in the first direction is in contact with the wide region 20a. An end of the second narrow region 20c in the first direction is in contact with the wide region 20a. The second narrow region 20c is separated from the first narrow region 20b in the second direction. The second superconducting layer 23 in the first narrow region 20b and the second superconducting layer 23 in the second narrow region 20c are separated from each other in the second direction.

The slit 20x is provided between the first narrow region 20b and the second narrow region 20c. The slit 20x corresponds to a portion between the first narrow region 20b and the second narrow region 20c. The slit 20x is a groove provided in the second superconducting wire 20. A second superconducting layer 23 is divided by the slit 20x.

The connection layer 40 and the first superconducting layer 13 are present in the third direction of the slit 20x. The connection layer 40 and the first superconducting layer 13 are present in the third direction of the portion between the first narrow region 20b and the second narrow region 20c.

The second superconducting wire 20 is not present in a direction opposite to the first direction of the slit 20x. The second superconducting wire 20 is not present in a direction opposite to the first direction of the portion between the first narrow region 20b and the second narrow region 20c.

The third superconducting wire 30 includes a wide region 30a, a first narrow region 30b, a second narrow region 30c, and a slit 30x.

The wide region 30a is an example of a fourth region. The first narrow region 30b is an example of a fifth region. The second narrow region 30c is an example of a sixth region. The slit 30x is an example of a portion between the fifth region and the sixth region.

A width of the wide region 30a in the second direction is a fourth width w4. A width of the first narrow region 30b in the second direction is a fifth width w5. A width of the second narrow region 30c in the second direction is a sixth width w6.

The fifth width w5 is smaller than the fourth width w4. The sixth width w6 is smaller than the fourth width w4.

An end of the first narrow region 30b in the first direction is in contact with the wide region 30a. An end of the second narrow region 30c in the first direction is in contact with the wide region 30a. The second narrow region 30c is separated from the first narrow region 30b in the second direction. The third superconducting layer 33 in the first narrow region 30b and the third superconducting layer 33 in the second narrow region 30c are separated from each other in the second direction.

The slit 30*x* is provided between the first narrow region 30*b* and the second narrow region 30*c*. The slit 30*x* corresponds to a portion between the first narrow region 30*b* and the second narrow region 30*c*. The slit 30*x* is a groove provided in the third superconducting wire 30. A third superconducting layer 33 is divided by the slit 30*x*.

The connection layer 40 and the second superconducting layer 23 are present in a direction opposite to the third direction of the slit 30*x*. The connection layer 40 and the second superconducting layer 23 are present in a direction opposite to the third direction of the portion between the first narrow region 30*b* and the second narrow region 30*c*.

The third superconducting wire 30 is not present in a direction opposite to the first direction of the slit 30*x*. The third superconducting wire 30 is not present in a direction opposite to the first direction of the portion between the first narrow region 30*b* and the second narrow region 30*c*.

FIGS. 4A, 4B, and 4C are explanatory diagrams of the connection structure of a superconducting layer of the first embodiment. FIGS. 4A, 4B, and 4C correspond to FIGS. 2A, 2B, and 2C, respectively.

A shape of the second superconducting wire 20 is, for example, line-symmetric with respect to a line segment SS' passing through a center of the second superconducting wire 20 in the second direction and parallel to the first direction.

An area of a portion of the second superconducting wire 20 in contact with the connection layer 40 is defined as S1. A product of a distance d1 in the first direction between an end E1 of the second superconducting wire 20 in the direction opposite to the first direction and an end E2 of the first superconducting wire 10 in the first direction and a width wa of the second superconducting wire 20 in the second direction is defined as S2. For example, S1 is 50% or more of S2.

An area of the slit 20*x* is defined as S3. For example, the area S3 of the slit 20*x* is less than 50% of S2.

A distance between the end E1 of the second superconducting wire 20 in the direction opposite to the first direction and an end E3 of the first narrow region 20*b* in the first direction is smaller than the distance d1 in the first direction between the end E1 of the second superconducting wire 20 in the direction opposite to the first direction and the end E2 of the first superconducting wire 10 in the first direction. In other words, a length of the slit 20*x* in the first direction is shorter than the distance d1 in the first direction between the end E1 of the second superconducting wire 20 in the direction opposite to the first direction and the end E2 of the first superconducting wire 10 in the first direction.

For example, a distance d2 in the first direction between the end E3 of the first narrow region 20*b* in the first direction and the end E2 of the first superconducting wire 10 in the first direction is smaller than the width wa of the second superconducting wire 20 in the second direction. In other words, for example, the distance d2 in the first direction between the slit 20*x* and the end E2 of the first superconducting wire 10 in the first direction is smaller than the width wa of the second superconducting wire 20 in the second direction.

For example, the distance d2 in the first direction between the end E3 of the first narrow region 20*b* in the first direction and the end E2 of the first superconducting wire 10 in the first direction is ¼ or more of the width wa of the second superconducting wire 20 in the second direction. In other words, for example, the distance d2 in the first direction between the slit 20*x* and the end E2 of the first superconducting wire 10 in the first direction is ¼ or more of the width wa of the second superconducting wire 20 in the second direction.

A shape of the third superconducting wire 30 is, for example, line-symmetric with respect to the line segment SS' passing through a center of the third superconducting wire 30 in the second direction and parallel to the first direction.

An area of a portion of the third superconducting wire 30 in contact with the connection layer 40 is defined as S4. A product of a distance d3 in the first direction between an end E4 of the third superconducting wire 30 in the direction opposite to the first direction and an end E5 of the second superconducting wire 20 in the first direction and a width wb of the third superconducting wire 30 in the second direction is defined as S5. For example, S4 is 50% or more of S5.

An area of the slit 30*x* is defined as S6. For example, the area S6 of the slit 30*x* is less than 50% of S5.

A distance between the end E4 of the third superconducting wire 30 in the direction opposite to the first direction and an end E6 of the first narrow region 30*b* in the first direction is smaller than the distance d3 in the first direction between the end E4 of the third superconducting wire 30 in the direction opposite to the first direction and the end E5 of the second superconducting wire 20 in the first direction. In other words, a length of the slit 30*x* in the first direction is shorter than the distance d3 in the first direction between the end E4 of the third superconducting wire 30 in the direction opposite to the first direction and the end E5 of the second superconducting wire 20 in the first direction.

For example, a distance d4 in the first direction between the end E6 of the first narrow region 30*b* in the first direction and the end E5 of the second superconducting wire 20 in the first direction is smaller than the width wb of the third superconducting wire 30 in the second direction. In other words, for example, the distance d4 in the first direction between the slit 30*x* and the end E5 of the second superconducting wire 20 in the first direction is smaller than the width wb of the third superconducting wire 30 in the second direction.

For example, the distance d4 in the first direction between the end E6 of the first narrow region 30*b* in the first direction and the end E5 of the second superconducting wire 20 in the first direction is ¼ or more of the width wb of the third superconducting wire 30 in the second direction. In other words, for example, the distance d4 in the first direction between the slit 30*x* and the end E5 of the second superconducting wire 20 in the first direction is ¼ or more of the width wb of the third superconducting wire 30 in the second direction.

Next, an example of a method for connecting the superconducting layer of the first embodiment will be described.

Figure 9:
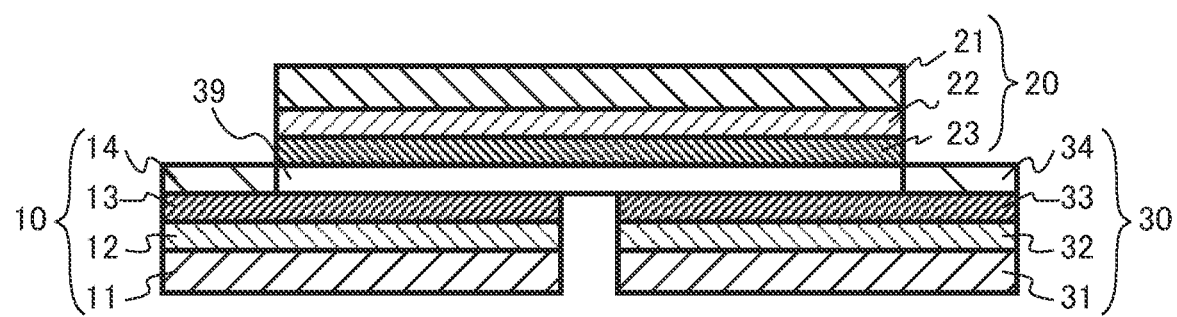
FIG. 9 is an explanatory diagram of a state in which the first superconducting layer overlaps the second superconducting layer and the third superconducting layer overlaps the second superconducting layer in the method for connecting the superconducting layer of the first embodiment.
Figure 10:
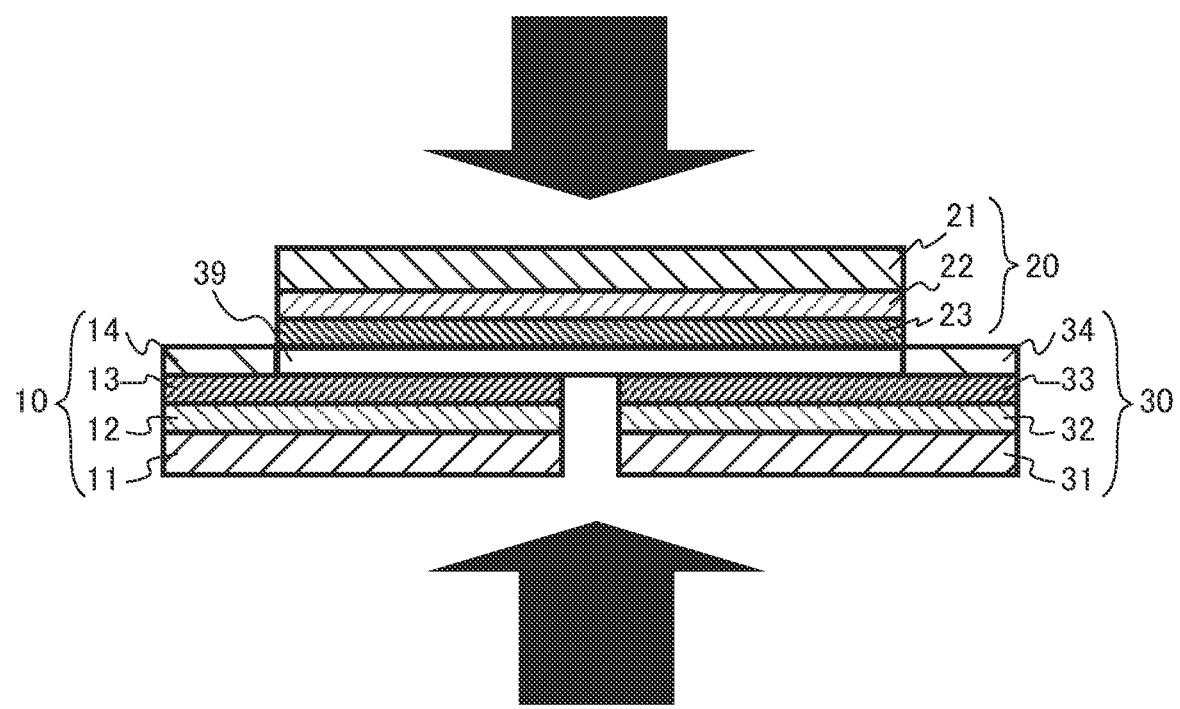
FIG. 10 is an explanatory diagram of a state in which the first superconducting layer and the second superconducting layer are pressurized and the third superconducting layer and the second superconducting layer are pressurized in the method for connecting the superconducting layer of the first embodiment are pressurized.

FIGS. 5, 6, 7, 8, 9, and 10 are explanatory diagrams of the method for connecting the superconducting layer of the first embodiment. FIG. 5 is an explanatory diagram of preparation of the first superconducting wire, the second superconducting wire, and the third superconducting wire in the method for connecting the superconducting layer of the first embodiment. FIG. 6 is an explanatory diagram of removal of the first protective layer, the second protective layer, and the third protective layer. FIG. 7 is an explanatory diagram of application of slurry on the second superconducting layer in the method for connecting the superconducting layer of the first embodiment. FIG. 8 is an explanatory diagram of a state in which the first superconducting layer faces the second superconducting layer and the third superconducting layer faces the second superconducting layer in the method for connecting the superconducting layer of the first embodiment. FIG. 9 is an explanatory diagram of a state in which the first superconducting layer overlaps the second superconducting layer and the third superconducting layer overlaps the second superconducting layer in the method for connecting the superconducting layer of the first embodiment. FIG. 10 is an explanatory diagram of a state in which the first superconducting layer and the second superconducting layer are pressurized and the third superconducting layer and the second superconducting layer are pressurized in the method for connecting the superconducting layer of the first embodiment.

A connection method of a superconducting layer of the first embodiment includes preparing a first superconducting member including a first superconducting layer and a first substrate which supports the first superconducting layer, and extends in a first direction, and a second superconducting member including a second superconducting layer facing the first superconducting layer and a second substrate which supports the second superconducting layer, and extends in the first direction, the second superconducting member having a first region of which a width in a second direction perpendicular to the first direction is a first width, a second region of which a width in the second direction is a second width, and a third region which is separated in the second direction from the second region and of which a width in the second direction is a third width, the second width being smaller than the first width, the third width being smaller than the first width, an end of the second region in the first direction being in contact with the first region, an end of the third region in the first direction being in contact with the first region, producing a slurry containing a rare earth element (RE), barium (Ba), copper (Cu), and oxygen (O), applying the slurry onto the first superconducting layer or the second superconducting layer, overlapping the first superconducting layer and the second superconducting layer each other with the slurry interposed between the superconducting layers, performing a first heat treatment at a first temperature, and performing a second heat treatment at a second temperature in an air atmosphere having the same oxygen partial pressure as the first heat treatment or an oxygen partial pressure higher than the first heat treatment.

First, the first superconducting wire 10, the second superconducting wire 20, and the third superconducting wire 30 are prepared (FIG. 5).

The first superconducting wire 10 includes a first substrate 11, a first intermediate layer 12, a first superconducting layer 13, and a first protective layer 14. The second superconducting wire 20 includes a second substrate 21, a second intermediate layer 22, a second superconducting layer 23, and a second protective layer 24. The third superconducting wire 30 includes a third substrate 31, a third intermediate layer 32, a third superconducting layer 33, and a third protective layer 34.

Subsequently, the first protective layer 14 on the first superconducting layer 13 is partially removed. The third protective layer 34 on the third superconducting layer 33 is partially removed. The second protective layer 24 on the second superconducting layer 23 is removed (FIG. 6). The first protective layer 14, the second protective layer 24, and the third protective layer 34 are removed by using, for example, a wet etching method.

Subsequently, a slurry 39 is produced. The slurry 39 contains a rare earth element (RE), barium (Ba), copper (Cu), and oxygen (O).

The slurry 39 contains, for example, particles containing a rare earth element (RE), barium (Ba), copper (Cu), and oxygen (O). The slurry 39 contains, for example, first particles containing a rare earth element (RE) and oxygen (O), second particles containing barium (Ba) and oxygen (O), or third particles containing copper (Cu) and oxygen (O).

The slurry 29 contains, for example, a sintering aid and a thickener. The sintering aid is, for example, sodium alginate.

Subsequently, the slurry 39 is applied onto the second superconducting layer 23 (FIG. 7).

Subsequently, for example, the second superconducting wire 20 is reversed, and the first superconducting layer 13 faces the second superconducting layer 23 and the third superconducting layer 33 faces the second superconducting layer 23 with the slurry 39 interposed between the superconducting layers (FIG. 8). The first superconducting layer 13 overlaps the second superconducting layer 23, and the third superconducting layer 33 overlaps the second superconducting layer 23 (FIG. 9).

Subsequently, the overlapped first superconducting layer 13 and second superconducting layer 23 is pressurized, and the overlapped third superconducting layer 33 and second superconducting layer 23 is pressurized (FIG. 10). For example, a pressure is applied by placing a weight on the overlapped portion. For example, the pressure is applied by using a pressing machine. For example, it is also possible to produce a jig for pressurization and to perform pressurization by sandwiching the jig. When the jig is used, the jig may be removed after the connection, or the attached jig may be maintained. When the jig is removed, a coil is easily wound, and thus, it is preferable to remove the jig.

Subsequently, a first heat treatment is performed at a first temperature. The first heat treatment is performed in a state in which the first superconducting layer 13 and the second superconducting layer 23 are pressured and the third superconducting layer 33 and the second superconducting layer 23 are pressurized.

The first temperature is, for example, equal to or more than 500° C. and equal to or less than 850° C. The first temperature is preferably, for example, equal to or more than 600° C. and equal to or less than 800° C. The first heat treatment is performed, for example, at an atmospheric pressure. The first heat treatment is performed, for example, in an air atmosphere, an Ar atmosphere, a nitrogen atmosphere, an oxygen atmosphere, a mixed atmosphere of Ar and oxygen, or a mixed atmosphere of nitrogen and oxygen.

By the first heat treatment, the particles in the slurry 39 are reacted or sintered.

By the first heat treatment, for example, an organic substance contained in the slurry 39 is desorbed. By the first heat treatment, for example, carbon (C) contained in the slurry 39 is desorbed.

Subsequently, a second heat treatment is performed at a second temperature. The second heat treatment is performed in an atmosphere containing oxygen. The second heat treatment is performed in an atmosphere having the same oxygen partial pressure as the first heat treatment or an oxygen partial pressure higher than the first heat treatment. The second heat treatment is oxygen annealing.

The second temperature is, for example, lower than the first temperature. The second temperature is, for example, equal to or more than 400° C. and equal to or less than 600° C. The second heat treatment may be performed by cooling the superconducting wires to a temperature lower than the second temperature after the first heat treatment and then reheating the superconducting wires to the second temperature. The second heat treatment may be performed by continuously lowering the temperature to the second temperature after the first heat treatment.

The second heat treatment is performed, for example, at an atmospheric pressure. The oxygen partial pressure of the atmosphere of the second heat treatment is, for example, 30% or more.

The connection layer 40 is formed by the first heat treatment and the second heat treatment. A crystal of an oxide superconductor is formed in the connection layer 40.

The crystal formed in the connection layer 40 contains a rare earth element (RE), barium (Ba), copper (Cu), and oxygen (O). The crystal is a rare earth oxide. The crystal is, for example, a single crystal or a polycrystal having a perovskite structure. The crystal has, for example, a chemical composition represented by $(RE)Ba_2Cu_3O_\delta$ (RE is a rare earth element, $6 \leq \delta \leq 7$).

The first superconducting layer 13 and the second superconducting layer 23 are connected by the above method. The third superconducting layer 33 and the second superconducting layer 23 are connected. The connection structure 50 of the first embodiment is formed by the above method.

Next, functions and effects of the connection structure 50 of a superconducting layer of the first embodiment and the superconducting wire 100 of the first embodiment will be described.

For example, in a nuclear magnetic resonance apparatus (NMR) or a magnetic resonance imaging apparatus (MRI), a superconducting coil is used to generate a strong magnetic field. The superconducting coil is formed by winding a superconducting wire around a winding frame.

In order to lengthen the superconducting wire, for example, a plurality of superconducting wires is connected. For example, ends of two superconducting wires are connected by using a connection structure. The connection structure for connecting the superconducting wires is required to have low electric resistance and high mechanical strength.

FIGS. 11A, 11B, and 11C are schematic diagrams of a connection structure of a superconducting layer of a comparative example. FIG. 11A is a front view, FIG. 11B is a rear view, and FIG. 11C is a cross-sectional view taken along a line EE' of FIGS. 11A and 11B. FIGS. 11A, 11B, and 11C are diagrams corresponding to FIGS. 2A, 2B, and 2C of the connection structure of a superconducting layer of the first embodiment.

A connection structure 90 of a superconducting layer of the comparative example is different from the connection structure 50 of a superconducting layer of the first embodiment in that the second superconducting wire 20 does not include the wide region 20a, the first narrow region 20b, the second narrow region 20c, and the slit 20x. The connection structure 90 of a superconducting layer of the comparative example is different from the connection structure 50 of a superconducting layer of the first embodiment in that the third superconducting wire 30 does not include the wide region 30a, the first narrow region 30b, the second narrow region 30c, and the slit 30x.

When the connection structure 90 of a superconducting layer is manufactured, a heat treatment is performed in a state in which the slurry 39 is sandwiched between the first superconducting layer 13 and the second superconducting layer 23 and between the third superconducting layer 33 and the second superconducting layer 23. During the heat treatment, as indicated by black arrows in FIGS. 11A and 11B, oxygen is supplied from the end of the first superconducting wire 10, the second superconducting wire 20, or the third superconducting wire 30 to the slurry 39 to become the connection layer 40. Oxygen is supplied to the slurry 39 to become the connection layer 40, and thus, an oxide superconductor is formed. Accordingly, a resistance of the connection layer 40 is reduced. The mechanical strength of the connection layer 40 increases.

During the heat treatment, carbon or an organic substance is desorbed from the slurry 39, and thus, the formation of the oxide superconductor is promoted and the electrical resistance of the connection layer 40 decreases. The mechanical strength of the connection layer 40 increases.

In the case of the connection structure 90 of a superconducting layer of the comparative example, there is a concern that the supply of oxygen to a region R surrounded by a dotted line in FIGS. 11A and 11B is insufficient during the heat treatment. In the case of the connection structure 90 of a superconducting layer of the comparative example, there is a concern that the desorption of the carbon or the organic substance from the region R becomes insufficient during the heat treatment. The region R is a region far away from the ends of the first superconducting wire 10, the second superconducting wire 20, and the third superconducting wire 30.

In the case of the connection structure 90 of a superconducting layer of the comparative example, there is a concern that the electrical resistance of the connection layer 40 increases or the mechanical strength of the connection layer 40 decreases due to the insufficient supply of the oxygen to the region R or the insufficient desorption of the carbon or the organic substance.

FIGS. 12A, 12B, and 12C are explanatory diagrams of the functions and effects of the connection structure of a superconducting layer of the first embodiment. FIGS. 12A, 12B, and 12C are explanatory diagrams of an oxygen supply effect of the connection structure of a superconducting layer of the first embodiment. FIGS. 12A, 12B, and 12C are diagrams corresponding to FIGS. 2A, 2B, and 2C.

In the connection structure 50 of a superconducting layer of the first embodiment, the second superconducting wire 20 includes the wide region 20a, the first narrow region 20b, the second narrow region 20c, and the slit 20x. In the connection structure 50 of a superconducting layer, the third superconducting wire 30 includes the wide region 30a, the first narrow region 30b, the second narrow region 30c, and the slit 30x.

Due to the presence of the slit 20x and the slit 30x, as compared with the connection structure 90 of the comparative example, when the connection structure 50 is manufactured, there is no region in which the distances from the ends of the first superconducting wire 10, the second superconducting wire 20, and the third superconducting wire 30 are long in the slurry 39 to become the connection layer 40.

As indicated by black arrows in FIGS. 12A and 12B, during the heat treatment, a sufficient amount of oxygen is supplied from the slits 20x and 30x to the slurry 39 to become the connection layer 40. Accordingly, the formation of the oxide superconductor is promoted, and the electrical resistance of the connection layer 40 decreases. The mechanical strength of the connection layer 40 increases.

In addition, carbon or an organic substance is sufficiently desorbed from the slurry 39. Accordingly, the formation of the oxide superconductor is promoted, and the electrical resistance of the connection layer 40 decreases. The mechanical strength of the connection layer 40 increases.

Figure 13A:
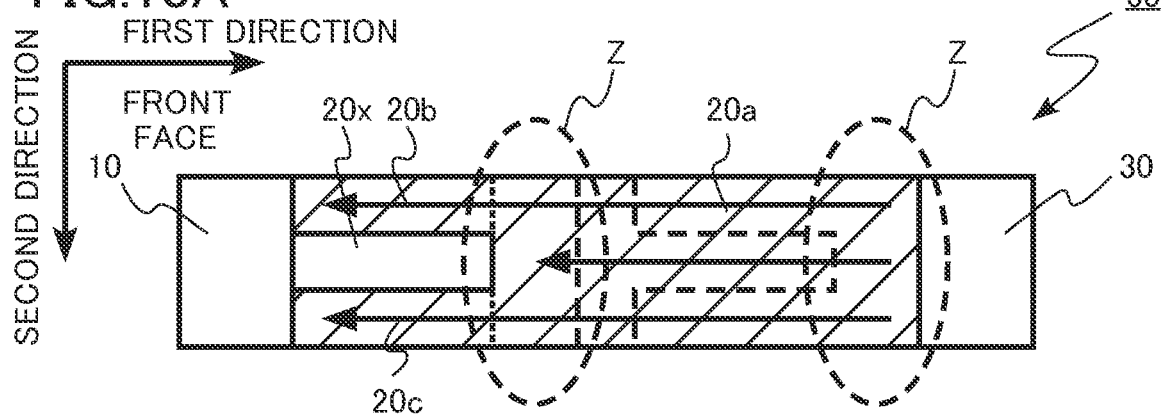
FIGS. 13A, 13B, and 13C are explanatory diagrams of a current characteristic improvement effect of the connection structure of a superconducting layer of the first embodiment.
Figure 13B:
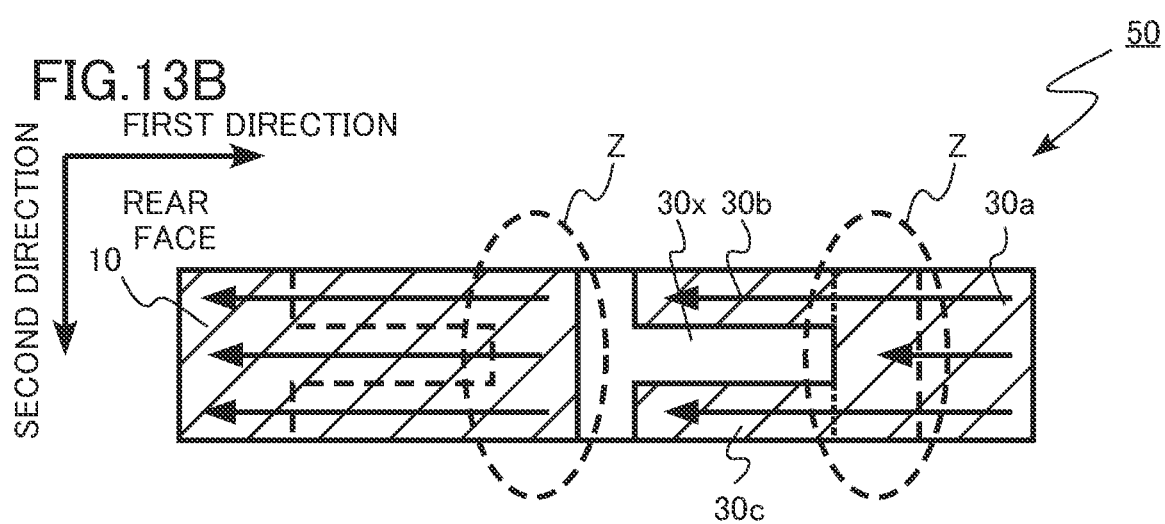
Figure 13C:
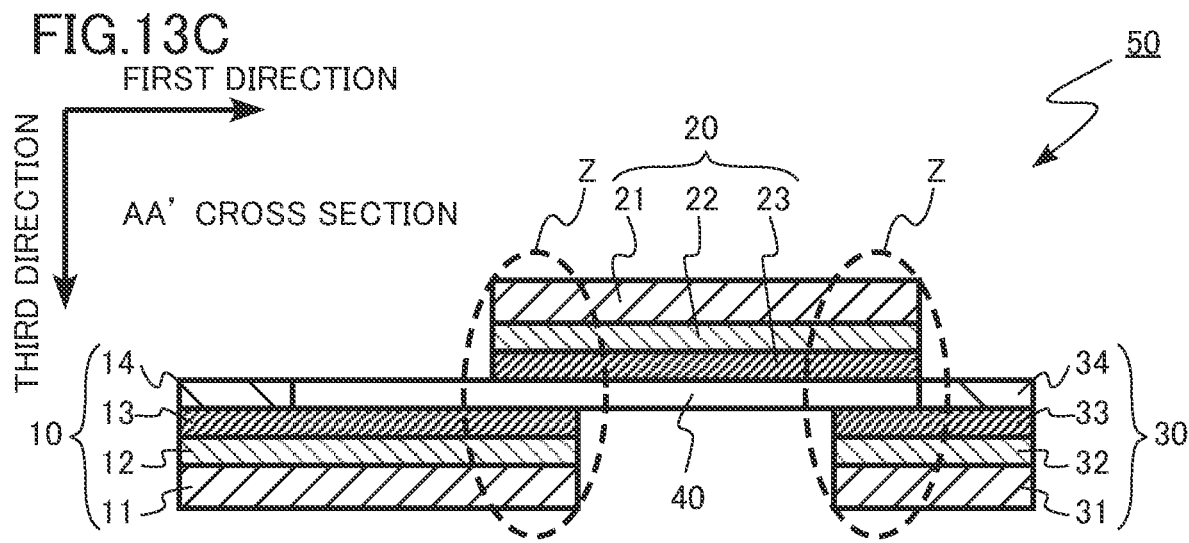

FIGS. 13A, 13B, and 13C are explanatory diagrams of the functions and effects of the connection structure of a superconducting layer of the first embodiment, and FIGS. 13A, 13B, and 13C are explanatory diagrams of a current characteristic improvement effect of the connection structure of a superconducting layer of the first embodiment. FIGS. 13A, 13B, and 13C correspond to FIGS. 2A, 2B, and 2C, respectively.

In FIGS. 13A, 13B, and 13C, black arrows indicate flows of electrons. In the connection structure 50 of a superconducting layer of the first embodiment, the slit 20x is not provided in the second superconducting wire 20 in a region Z in which a current density is high as illustrated in FIGS. 13A, 13B, and 13C. The slit 30x is not provided in the third superconducting wire 30 in the region Z in which the current density is high. Accordingly, a large current can flow through the connection structure 50.

In the connection structure 50 of a superconducting layer, the shape of the second superconducting wire 20 is preferably line-symmetric with respect to the line segment SS' passing through the center of the second superconducting wire 20 in the second direction and parallel to the first direction. Since the shape of the second superconducting wire 20 is line-symmetric, the current flow becomes uniform, and the current characteristics of the connection structure 50 of a superconducting layer are stabilized.

An area of a portion of the second superconducting wire 20 in contact with the connection layer 40 is defined as S1. In the connection structure 50 of a superconducting layer, the product of the distance d1 in the first direction between the end E1 of the second superconducting wire 20 in the direction opposite to the first direction and the end E2 of the first superconducting wire 10 in the first direction and the width wa of the second superconducting wire 20 in the second direction is defined as S2. S1 is preferably 50% or more of S2. The area of the slit 20x is defined as S3. The area S3 of the slit 20x is preferably less than 50% of S2.

According to the above aspect, a ratio of the area of the portion of the second superconducting wire 20 in contact with the connection layer 40 increases. Thus, the mechanical strength of the connection structure 50 of a superconducting layer further increases.

In the connection structure 50 of a superconducting layer, the distance d2 in the first direction between the end E3 of the first narrow region 20b in the first direction and the end E2 of the first superconducting wire 10 in the first direction is preferably smaller than the width wa of the second superconducting wire 20 in the second direction. In other words, in the connection structure 50 of a superconducting layer, the distance d2 in the first direction between the slit 20x and the end E2 of the first superconducting wire 10 in the first direction is preferably smaller than the width wa of the second superconducting wire 20 in the second direction.

According to the above aspect, the supply of the oxygen to the slurry 39 to become the connection layer 40 is further promoted. According to the above aspect, the desorption of the carbon or the organic substance from the slurry 39 to become the connection layer 40 is further promoted. Thus, the electrical resistance of the connection structure 50 of a superconducting layer further decreases, and the mechanical strength of the connection structure 50 of a superconducting layer further increases.

In the connection structure 50 of a superconducting layer, the distance d2 in the first direction between the end E3 of the first narrow region 20b in the first direction and the end E2 of the first superconducting wire 10 in the first direction is preferably ¼ or more of the width wa of the second superconducting wire 20 in the second direction. In other words, the distance d2 in the first direction between the slit 20x and the end E2 of the first superconducting wire 10 in the first direction is preferably ¼ or more of the width wa of the second superconducting wire 20 in the second direction.

According to the above aspect, it is possible to flow a large current in the region Z in which the current density is high.

In the connection structure 50 of a superconducting layer, the shape of the third superconducting wire 30 is preferably line-symmetric with respect to the line segment SS' passing through the center of the third superconducting wire 30 in the second direction and parallel to the first direction. Since the shape of the third superconducting wire 30 is line-symmetric, the current flow becomes uniform, and the current characteristics of the connection structure 50 of a superconducting layer are stabilized.

An area of a portion of the third superconducting wire 30 in contact with the connection layer 40 is defined as S4. In the connection structure 50 of a superconducting layer, the product of the distance d3 in the first direction between the end E4 of the third superconducting wire 30 in the direction opposite to the first direction and the end E5 of the second superconducting wire 20 in the first direction and the width wb of the third superconducting wire 30 in the second direction is defined as S5. S4 is preferably 50% or more of S5. The area of the slit 30x is defined as S6. In the connection structure 50 of a superconducting layer, the area S6 of the slit 30x is preferably less than 50% of S5.

According to the above aspect, the ratio of the area of the portion of the third superconducting wire 30 in contact with the connection layer 40 increases, and the mechanical strength of the connection structure 50 of a superconducting layer further increases.

In the connection structure 50 of a superconducting layer, the distance d4 in the first direction between the end E6 of the first narrow region 30b in the first direction and the end E5 of the second superconducting wire 20 in the first direction is preferably smaller than the width wb of the third superconducting wire 30 in the second direction. In other words, for example, the distance d4 in the first direction between the slit 30x and the end E5 of the second superconducting wire 20 in the first direction is preferably smaller than the width wb of the third superconducting wire 30 in the second direction.

According to the above aspect, the supply of the oxygen to the slurry 39 to become the connection layer 40 is further promoted. According to the above aspect, the desorption of the carbon or the organic substance from the slurry 39 to become the connection layer 40 is further promoted. Thus, the electrical resistance of the connection structure 50 of a superconducting layer further decreases, and the mechanical strength further increases.

In the connection structure 50 of a superconducting layer, the distance d4 in the first direction between the end E6 of the first narrow region 30b in the first direction and the end E5 of the second superconducting wire 20 in the first direction is preferably ¼ or more of the width wb of the third superconducting wire 30 in the second direction. In other words, the distance d4 in the first direction between the slit 30x and the end E5 of the second superconducting wire 20 in the first direction is preferably ¼ or more of the width wb of the third superconducting wire 30 in the second direction.

According to the above aspect, it is possible to flow a large current in the region Z in which the current density is high.

In the connection structure 50 of a superconducting layer, the slit 20x is provided in the second superconducting wire 20, and the slit 30x is provided in the third superconducting wire 30. Two slits are not provided in the second superconducting wire 20, and thus, the mechanical strength of the connection structure 50 of a superconducting layer increases.

Figure 14:
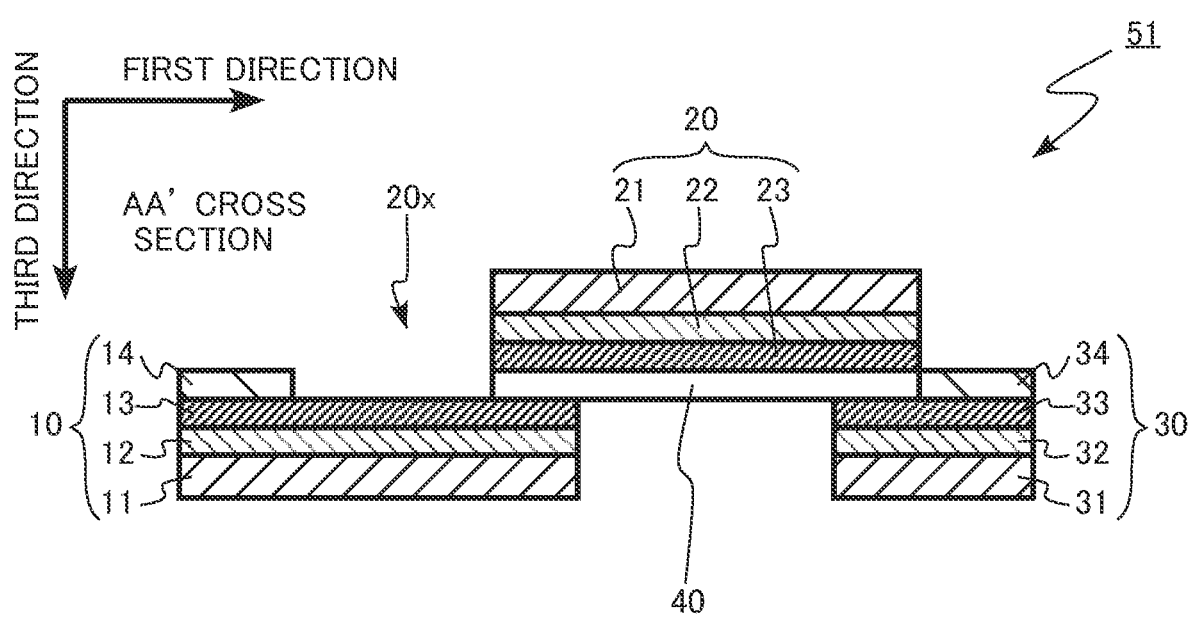
FIG. 14 is a schematic cross-sectional view of a modification example of the connection structure of a superconducting layer of the first embodiment.

FIG. 14 is a schematic cross-sectional view of a modification example of the connection structure of a superconducting layer of the first embodiment. FIG. 14 is a diagram corresponding to FIG. 2C.

A connection structure 51 of a superconducting layer of the modification example is different from the connection structure 50 of a superconducting layer of the first embodiment in that the connection layer 40 is not present in the third direction of the slit 20x.

As described above, according to the connection structure of a superconducting layer of the first embodiment, the modification example of the first embodiment, and the superconducting wire, low electric resistance and high mechanical strength can be realized.

Second Embodiment

A connection structure of a superconducting layer and a superconducting wire of a second embodiment are different from the connection structure of a superconducting layer of the first embodiment in that the second width increases in the first direction, a third width increases in the first direction, the fifth width increases in the first direction, and the sixth width increases in the first direction. Hereinafter, a part of contents overlapping the contents of the first embodiment will not be described.

Figure 15A:
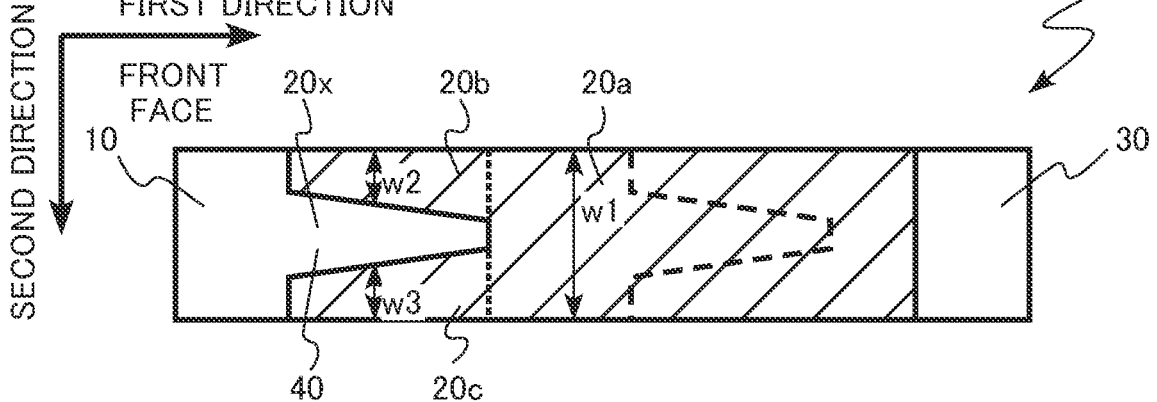
FIGS. 15A and 15B are schematic plan views of a connection structure of a superconducting layer of a second embodiment.
Figure 15B:
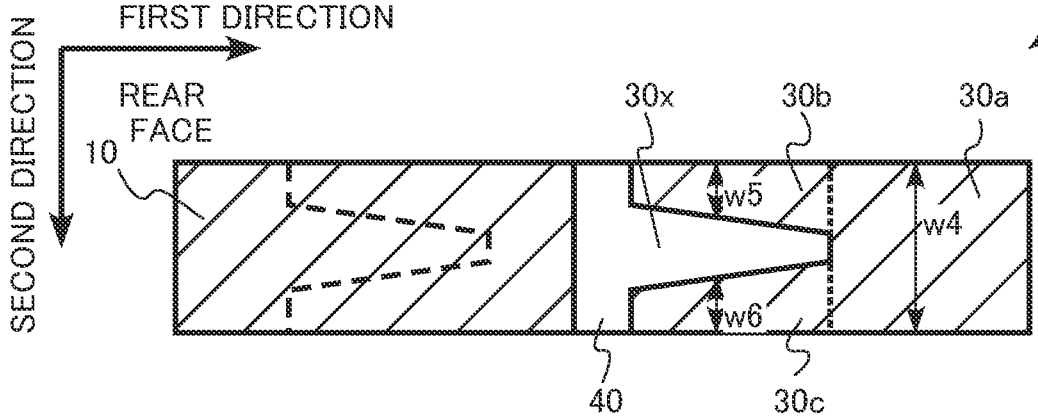

FIGS. 15A and 15B are schematic plan views of the connection structure of a superconducting layer of the second embodiment. FIG. 15A is a front view, and FIG. 15B is a rear view. FIG. 15A is a diagram corresponding to FIG. 2A of the first embodiment. FIG. 15B is a diagram corresponding to FIG. 2B of the first embodiment.

In a connection structure 52 of a superconducting layer of the second embodiment, a second width w2 of a first narrow region 20b of a second superconducting wire 20 increases in the first direction. A third width w3 of a second narrow region 20c increases in the first direction. A slit 20x has a trapezoidal shape.

In the connection structure 52 of a superconducting layer of the second embodiment, a fifth width w5 of a first narrow region 30b of a third superconducting wire 30 increases in the first direction. A sixth width w6 of a second narrow region 30c of the third superconducting wire 30 increases in the first direction. A slit 30x has a trapezoidal shape.

According to the connection structure 52 of a superconducting layer of the second embodiment, the resistance in the region in which the current density is high decreases, and a large current can flow.

FIGS. 16A and 16B are schematic plan views of a modification example of the connection structure of a superconducting layer of the second embodiment. FIG. 16A is a front view, and FIG. 16B is a rear view. FIG. 16A is a diagram corresponding to FIG. 15A. FIG. 16B is a diagram corresponding to FIG. 15B.

In a connection structure 53 of a superconducting layer of the modification example, a slit 20x has a triangular shape. A slit 30x has a triangular shape.

As described above, according to the connection structure of a superconducting layer of the second embodiment, the modification example of the second embodiment, and the superconducting wire, low electric resistance and high mechanical strength can be realized.

Third Embodiment

A connection structure of a superconducting layer and a superconducting wire of a third embodiment are different from the connection structure of a superconducting layer of the first embodiment in that a second superconducting member has two slits and a third superconducting member has two slits. Hereinafter, a part of contents overlapping the contents of the first embodiment will not be described.

Figure 17A:
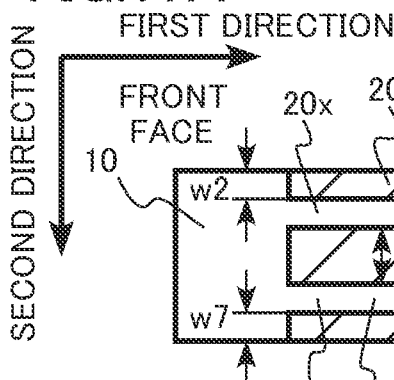
FIGS. 17A and 17B are schematic plan views of a connection structure of a superconducting layer of a third embodiment.
Figure 17B:
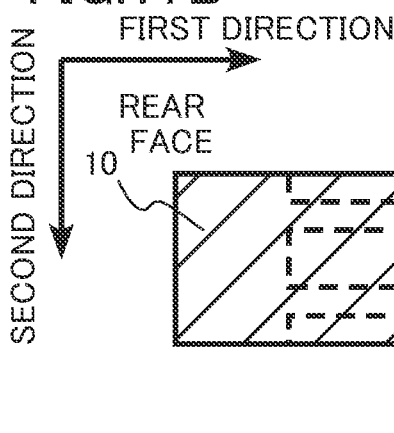

FIGS. 17A and 17B are schematic plan views of the connection structure of a superconducting layer of the third embodiment. FIG. 17A is a front view, and FIG. 17B is a rear view. FIG. 17A is a diagram corresponding to FIG. 2A of the first embodiment. FIG. 17B is a diagram corresponding to FIG. 2B of the first embodiment.

A second superconducting wire 20 of a connection structure 54 of a superconducting layer of the third embodiment includes a wide region 20a, a first narrow region 20b, a second narrow region 20c, a third narrow region 20d, a slit 20x, and a slit 20y.

A width of the wide region 20a in the second direction is a first width w1. A width of the third narrow region 20d in the second direction is a seventh width w7. The seventh width w7 is smaller than a first width w1.

An end of the third narrow region 20d in the first direction is in contact with the wide region 20a. The third narrow region 20d is separated in the second direction from the second narrow region 20c. A second superconducting layer 23 in the second narrow region 20c and a second superconducting layer 23 in the third narrow region 20d are separated from each other in the second direction.

A slit 20y is provided between the second narrow region 20c and the third narrow region 20d. The slit 20y corresponds to a portion between the second narrow region 20c and the third narrow region 20d. The slit 20y is a groove provided in the second superconducting wire 20.

A third superconducting wire 30 of the connection structure 54 of a superconducting layer of the third embodiment includes a wide region 30a, a first narrow region 30b, a second narrow region 30c, a third narrow region 30d, a slit 30x, and a slit 30y.

A width of the wide region 30a in the second direction is a fourth width w4. A width of the third narrow region 30d in the second direction is an eighth width w8. The eighth width w8 is smaller than a fourth width w4.

An end of the third narrow region 30d in the first direction is in contact with the wide region 30a. The third narrow region 30d is separated in the second direction from the second narrow region 30c. A third superconducting layer 33 in the second narrow region 30c and a third superconducting layer 33 in the third narrow region 30d are separated from each other in the second direction.

A slit 30y is provided between the second narrow region 30c and the third narrow region 30d. The slit 30y corresponds to a portion between the second narrow region 30c and the third narrow region 30d. The slit 30y is a groove provided in the third superconducting wire 30.

As described above, according to the connection structure of a superconducting layer and the superconducting wire of the third embodiment, low electric resistance and high mechanical strength can be realized.

Fourth Embodiment

A connection structure of a superconducting layer and a superconducting wire of the fourth embodiment are different from the connection structure of a superconducting layer of the first embodiment in that a second superconducting member includes an opening instead of the slit and a third superconducting member includes an opening instead of the slit. Hereinafter, a part of contents overlapping the contents of the first embodiment will not be described.

FIGS. 18A, 18B, and 18C are schematic plan views and a schematic cross-sectional view of the connection structure of a superconducting layer of the fourth embodiment. FIG. 18A is a front view, and FIG. 18B is a rear view. FIG. 18A is a diagram corresponding to FIG. 2A of the first embodiment. FIG. 18B is a diagram corresponding to FIG. 2B of the first embodiment.

A second superconducting wire 20 of a connection structure 55 of a superconducting layer of the fourth embodiment includes a wide region 20a, a first narrow region 20b, a second narrow region 20c, and an opening 20z.

The opening 20z is provided between the first narrow region 20b and the second narrow region 20c. The opening 20z is a hole provided in the second superconducting wire 20. The number of holes of the opening 20z may be plural.

A connection layer 40 and a first superconducting layer 13 are present in the third direction of the opening 202. A second superconducting layer 23 is divided by the opening 20z. The second superconducting wire 20 is present in a direction opposite to the first direction of the opening 20z.

A third superconducting wire 30 of the connection structure 55 of a superconducting layer of the fourth embodiment includes a wide region 30a, a first narrow region 30b, a second narrow region 30c, and an opening 30z.

The opening 30z is provided between the second narrow region 30c and the third narrow region 30d. The opening 30z is a hole provided in the third superconducting wire 30. The number of holes of the opening 30z may be plural.

The connection layer 40 and the second superconducting layer 23 are present in a direction opposite to the third direction of the opening 30z. A third superconducting layer 33 is divided by the opening 30z. The third superconducting wire 30 is present in a direction opposite to the first direction of the opening 30z.

As described above, according to the connection structure of a superconducting layer and the superconducting wire of the fourth embodiment, low electric resistance and high mechanical strength can be realized.

Fifth Embodiment

A connection structure of a superconducting layer and a superconducting wire of a fifth embodiment are different from the connection structure of a superconducting layer of the first embodiment in that a third superconducting member is not included. Hereinafter, a part of contents overlapping the contents of the first embodiment will not be described.

FIG. 19 is a schematic cross-sectional view of the superconducting wire of the fifth embodiment. A superconducting wire 200 of the fifth embodiment includes a first superconducting wire 10 and a second superconducting wire 20.

The first superconducting wire 10 extends in the first direction. The second superconducting wire 20 extends in the first direction. The superconducting wire 200 of the fifth embodiment is elongated in the first direction by connecting the first superconducting wire 10 to the second superconducting wire 20.

The superconducting wire 200 of the fifth embodiment includes a connection structure 60. In the connection structure 60, the first superconducting wire 10 and the second superconducting wire 20 are connected.

FIGS. 20A, 20B, and 20C are schematic plan views and a schematic cross-sectional view of the connection structure of a superconducting layer of the fifth embodiment. FIG. 20A is a front view, FIG. 20B is a rear view, and FIG. 20C is a cross-sectional view taken along a line GG' of FIGS. 20A and 20B. FIG. 19 is a cross section including a HH' cross section in FIGS. 20A and 20B.

In FIG. 20A, only the second superconducting wire 20 is hatched. In FIG. 20B, only the first superconducting wire 10 is hatched.

The connection structure 60 of the fifth embodiment includes the first superconducting wire 10, the second superconducting wire 20, and a connection layer 40.

The first superconducting wire 10 is an example of a first superconducting member. The second superconducting wire 20 is an example of a second superconducting member.

The first superconducting wire 10 includes a first substrate 11, a first intermediate layer 12, a first superconducting layer 13, and a first protective layer 14. The second superconducting wire 20 includes a second substrate 21, a second intermediate layer 22, and a second superconducting layer 23.

The second superconducting wire 20 includes a wide region 20a, a first narrow region 20b, a second narrow region 20c, and a slit 20x.

As described above, according to the connection structure of a superconducting layer and the superconducting wire of the fifth embodiment, low electric resistance and high mechanical strength can be realized.

Sixth Embodiment

A connection structure of a superconducting layer and a superconducting wire of a sixth embodiment are different from the connection structure of a superconducting layer of the first embodiment in that a reinforcing member is included. Hereinafter, a part of contents overlapping the contents of the first embodiment will not be described.

Figure 21:
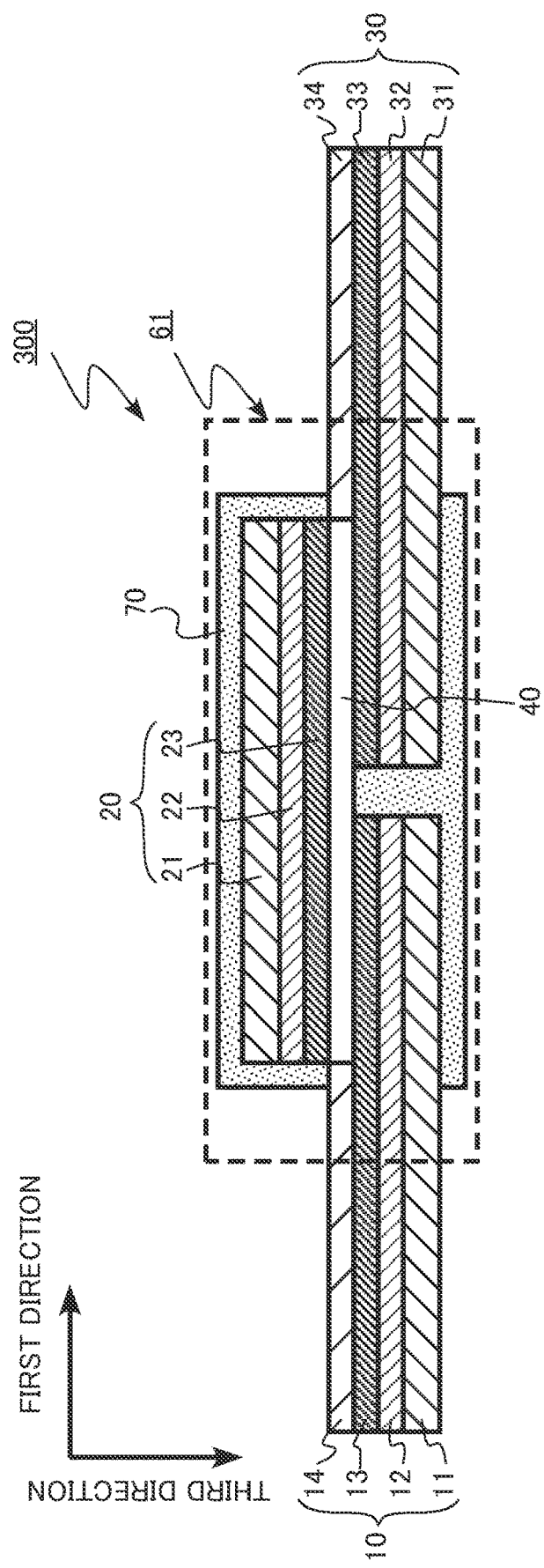
FIG. 21 is a schematic cross-sectional view of a connection structure of a superconducting layer of a sixth embodiment.

FIG. 21 is a schematic cross-sectional view of the superconducting wire of the sixth embodiment. A superconducting wire 300 of the sixth embodiment includes a first superconducting wire 10, a second superconducting wire 20, and a third superconducting wire 30.

The superconducting wire 300 of the sixth embodiment includes a connection structure 61. In the connection structure 61, the first superconducting wire 10 and the second superconducting wire 20 are connected. In the connection structure 61, the second superconducting wire 20 and the third superconducting wire 30 are connected.

Figure 22A:
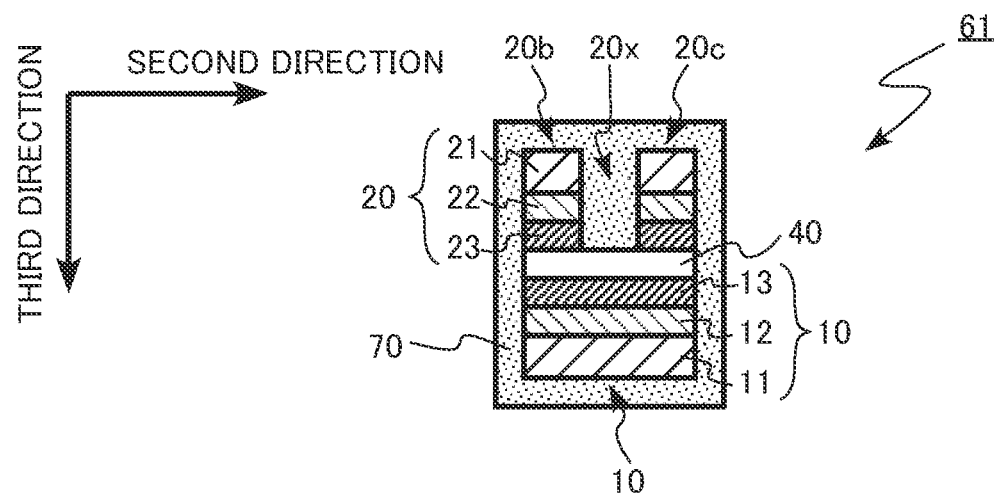
FIGS. 22A and 22B are a schematic plan view and a schematic cross-sectional view of the connection structure of a superconducting layer of the sixth embodiment.
Figure 22B:
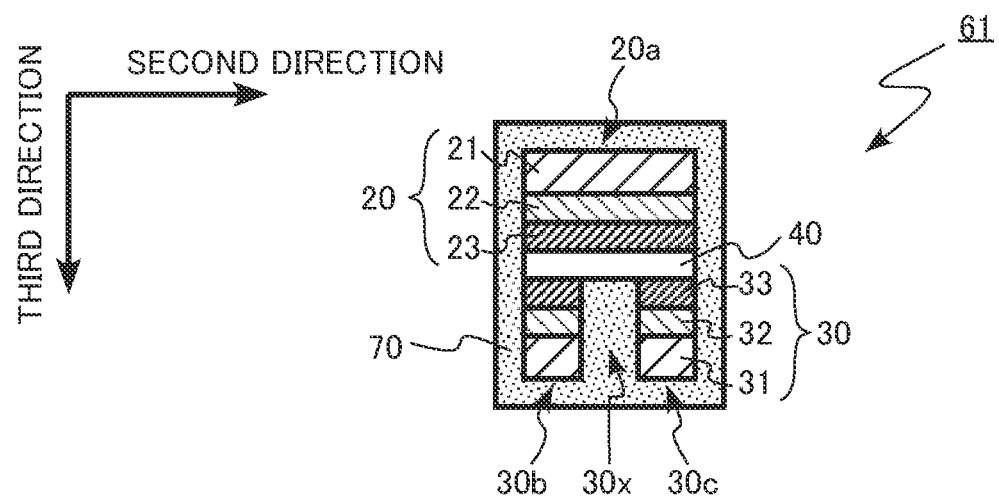

FIGS. 22A and 22B are schematic cross-sectional views of the connection structure of a superconducting layer of the sixth embodiment. FIG. 22A is a diagram corresponding to FIG. 3A of the first embodiment. FIG. 22B is a diagram corresponding to FIG. 3B of the first embodiment.

A reinforcing member 70 is provided on an outer peripheral portion of the connection structure 61 so as to surround the connection structure 61. The reinforcing member 70 has a function of improving the mechanical strength of the connection structure 61.

The reinforcing member 70 is provided between a first narrow region 20b and a second narrow region 20c of the second superconducting wire 20. The reinforcing member 70 fills a slit 20x.

The reinforcing member 70 is provided between a first narrow region 30b and a second narrow region 30c of the third superconducting wire 30. The reinforcing member 70 fills a slit 30x.

The reinforcing member 70 is, for example, metal or resin. The reinforcing member 70 is, for example, solder. The reinforcing member 70 is, for example, an epoxy resin.

As described above, according to the connection structure of a superconducting layer and the superconducting wire of the sixth embodiment, low electric resistance and high mechanical strength can be realized.

Seventh Embodiment

A superconducting coil of a seventh embodiment includes the superconducting wires of the first to sixth embodiments. Hereinafter, a part of overlapping the contents of the first to sixth embodiments will not be described.

Figure 23:
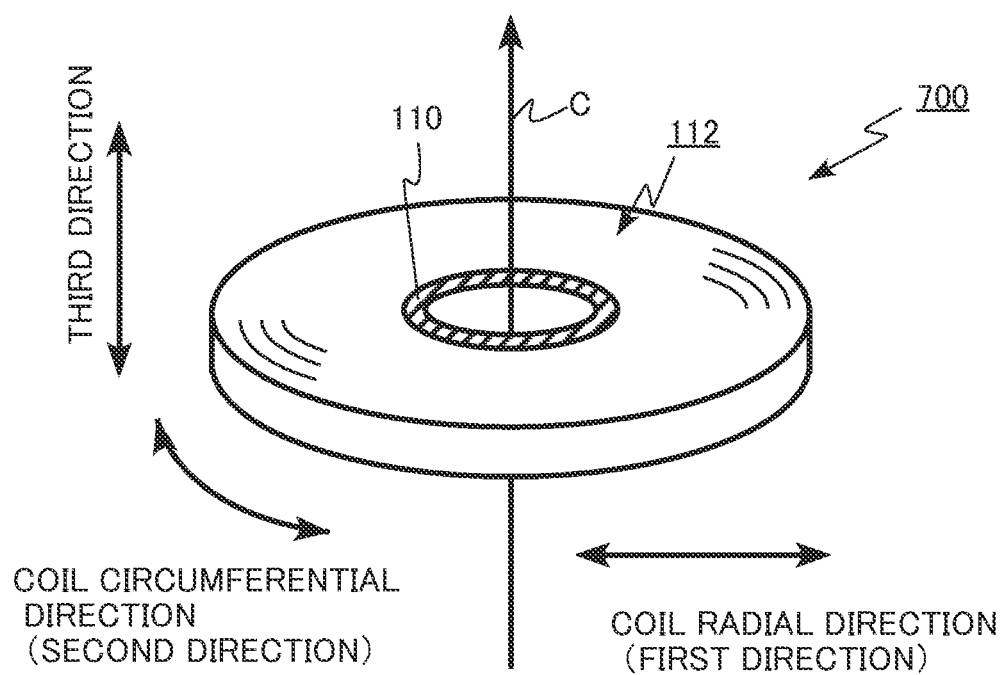
FIG. 23 is a schematic perspective view of a superconducting coil of a seventh embodiment.
Figure 24:
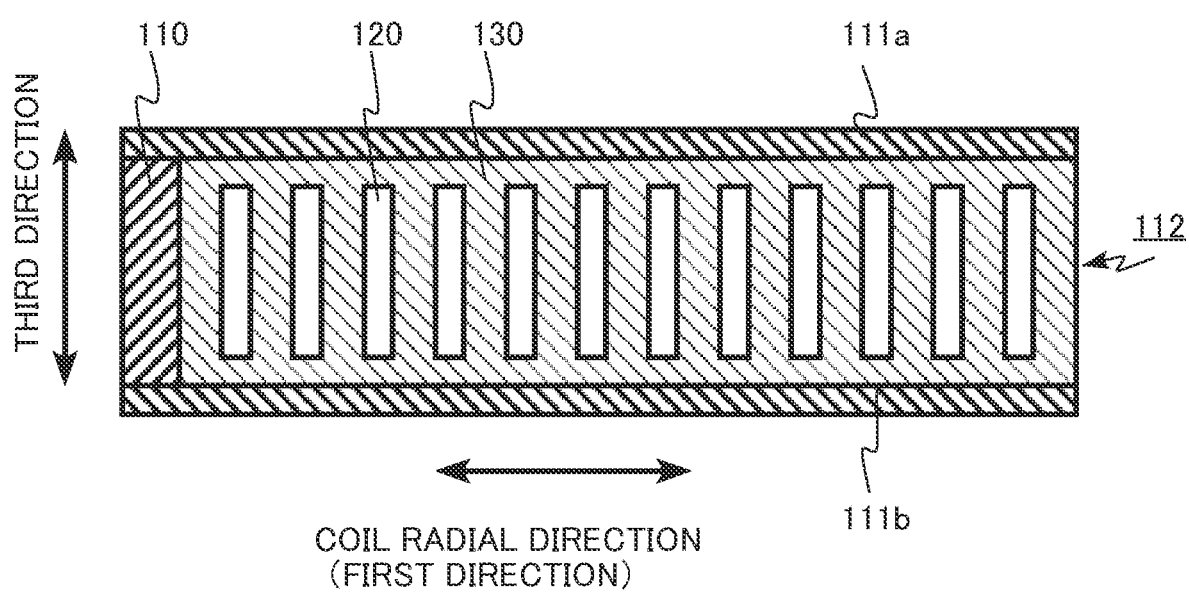
FIG. 24 is a schematic cross-sectional view of the superconducting coil of the seventh embodiment.

FIG. 23 is a schematic perspective view of the superconducting coil of the seventh embodiment. FIG. 24 is a schematic cross-sectional view of the superconducting coil of the seventh embodiment.

A superconducting coil 700 of the seventh embodiment is used as a coil for generating a magnetic field of a superconducting device such as an NMR, an MRI, a heavy particle radiotherapy device, or a superconducting magnetic-levitation railway vehicle.

The superconducting coil 700 includes a winding frame 110, a first insulating plate 111a, a second insulating plate 111b, and a winding portion 112. The winding portion 112 includes a superconducting wire 120 and an inter-wire layer 130.

FIG. 23 illustrates a state in which the first insulating plate 111a and the second insulating plate 111b are removed.

The winding frame 110 is made of, for example, fiber-reinforced plastic. The superconducting wire 120 has, for example, a tape shape. As illustrated in FIG. 23, the superconducting wire 120 is wound around the winding frame 110 in a concentric so-called pancake shape around a winding center C.

The inter-wire layer 130 has a function of fixing the superconducting wire 120. The inter-wire layer 130 has a function of suppressing the destruction of the superconducting wire 120 due to vibration during the use of the superconducting device or friction between the superconducting wire and the superconducting device.

The first insulating plate 111a and the second insulating plate 111b are made of, for example, fiber-reinforced plastic. The first insulating plate 111a and the second insulating plate 111b have a function of insulating the winding portion 112 from the outside. The winding portion 112 is disposed between the first insulating plate 111a and the second insulating plate lib.

The superconducting wires of the first to sixth embodiments are used as the superconducting wire 120.

As described above, according to the seventh embodiment, a superconducting coil with improved characteristics can be realized by including the superconducting wire having low electric resistance and high mechanical strength.

Eighth Embodiment

A superconducting device of an eighth embodiment is a superconducting device including the superconducting coil of the seventh embodiment. Hereinafter, a part of contents overlapping with the contents of the seventh embodiment will not be described.

Figure 25:
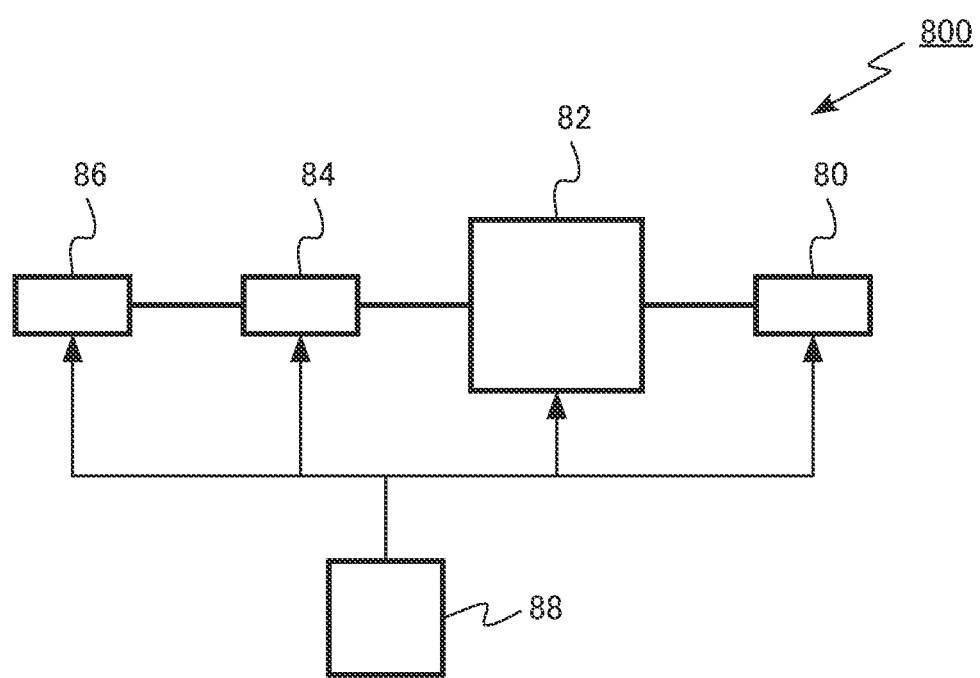
FIG. 25 is a block diagram of a superconducting device of an eighth embodiment.

FIG. 25 is a block diagram of a superconducting device of an eighth embodiment. The superconducting device of the eighth embodiment is a heavy particle radiotherapy device 800. The heavy particle radiotherapy device 800 is an example of the superconducting device.

The heavy particle radiotherapy device 800 includes an incidence system 80, a synchrotron accelerator 82, a beam transport system 84, an irradiation system 86, and a control system 88.

The incidence system 80 has, for example, a function of generating carbon ions to be used for treatment and performing preliminary acceleration for incidence into the synchrotron accelerator 82. The incidence system 80 includes, for example, an ion generation source and a linear accelerator.

The synchrotron accelerator 82 has a function of accelerating a carbon ion beam incident from the incidence system 80 to energy suitable for treatment. The superconducting coil 700 of the seventh embodiment is used for the synchrotron accelerator 82.

The beam transport system 84 has a function of transporting the carbon ion beam incident from the synchrotron accelerator 82 to the irradiation system 86. The beam transport system 84 includes, for example, a bending electromagnet.

The irradiation system 86 has a function of irradiating a patient to be irradiated with the carbon ion beam incident from the beam transport system 84. The irradiation system 86 has, for example, a rotary gantry that enables irradiation with the carbon ion beam from any direction. The superconducting coil 700 of the seventh embodiment is used for the rotary gantry.

The control system 88 controls the incidence system 80, the synchrotron accelerator 82, the beam transport system 84, and the irradiation system 86. The control system 88 is, for example, a computer.

In the heavy particle radiotherapy device 800 of the eighth embodiment, the superconducting coil 700 of the seventh embodiment is used for the synchrotron accelerator 82 and the rotary gantry. Accordingly, the heavy particle radiotherapy device 800 having excellent characteristics is realized.

In the eighth embodiment, although the case of the heavy particle radiotherapy device 800 has been described as an example of the superconducting device, the superconducting device may be a nuclear magnetic resonance apparatus (NMR), a magnetic resonance imaging apparatus (MRI), or a superconducting magnetic-levitation railway vehicle.

EXAMPLES

Example 1

The connection structure of a superconducting layer of the first embodiment illustrated in FIGS. 1 to 4C was formed. Three oxide superconducting wires in which an intermediate layer and a $GdBa_2Cu_3O_{7-\delta}$ layer (oxide superconducting layer) were formed on a Hastelloy base and were covered with a protective layer of silver and copper were prepared. A length of one wire was 1.6 cm, and lengths of the remaining two wires were 10 cm. The entire wire of 1.6 cm between both ends was wet-etched by using a mixed solution of nitric acid, ammonia, and hydrogen peroxide to expose the oxide superconducting layer. Portions of the two wires of 10 cm at 0.8 cm from one end were wet-etched by using a mixed solution of nitric acid, ammonia, and hydrogen peroxide to expose the oxide superconducting layer.

A central portion of the wire of 1.6 cm was cut out at a length of 0.6 cm from one end of the wire to prepare a slit having a width of 0.1 cm. Furthermore, the superconducting layer of one wire of the wires of 10 cm was cut out at the center portion of the wire by a length of 0.6 cm from the exposed end to form a slit having a width of 0.1 cm.

Powders of $Gd_2O_3$, $BaCO_3$, and $CuO$ having a particle size of about submicron were prepared, were appropriately weighed, and then were sufficiently mixed using a mortar. Water and sodium alginate were added to the resulting mixed powder to prepare a slurry.

The obtained slurry was applied to the exposed oxide superconducting layer of the wire of 1.6 cm. Thereafter, the structure illustrated in FIG. 8 was obtained by overlapping a portion coated with the slurry of the wire of 1.6 cm and a portion exposed from the superconducting layer of the wire of 10 cm each other so as to face each other and sandwiching these portions between plates from above and below. This structure was inserted in a furnace while being sandwiched between the plates, weights were provided on upper faces of the plates, and a load was applied to the connection portion.

A first heat treatment of heating this structure to 780° C. in the air atmosphere was performed with the weight provided on this structure. Thereafter, the connection structure of a superconducting layer was formed by cooling the heated structure to around a room temperature, introducing oxygen gas into the furnace, and performing a second heat treatment of heating the cooled structure to 500° C. in an oxygen atmosphere.

Terminals were attached to both ends of the connected superconducting wire, and the temperature dependence of the electric resistance was measured. As a result, a clear superconducting transition was confirmed at around 93K and a transition width of about 1K. Relative critical current values are illustrated in Examples and Comparative Examples below by using a critical current value after the superconducting transition of the connection structure of Example 1 as a reference value 1.0.

Example 2

The connection structure of a superconducting layer of the second embodiment illustrated in FIGS. 15A and 15B was formed. Three oxide superconducting wires in which an intermediate layer and a $GdBa_2Cu_3O_{7-\delta}$ layer (oxide superconducting layer) were formed on a Hastelloy base and were covered with a protective layer of silver and copper were prepared. A length of one wire was 1.6 cm, and lengths of the remaining two wires were 10 cm. The entire wire of 1.6 cm between both ends was wet-etched by using a mixed solution of nitric acid, ammonia, and hydrogen peroxide to expose the oxide superconducting layer. Portions of the two wires of 10 cm at 0.8 cm from one end were wet-etched by using a mixed solution of nitric acid, ammonia, and hydrogen peroxide to expose the oxide superconducting layer.

A first cut was formed to a position of 0.12 cm from a corner of one end of the wire of 1.6 cm, 0.6 cm from an end, and 0.18 cm from an edge. Subsequently, a second cut was formed to a position of 0.12 cm from the other corner of one end of the wire of 1.6 cm, 0.6 cm from the end, and 0.18 cm from the edge. A slit was formed by cutting two cuts at a position of 0.6 cm from the end so as to connect these cuts. A shape of the slit is a trapezoidal shape expanding toward the end. Furthermore, a slit was also formed in one superconducting layer of the wires of 10 cm in the same manner.

A connection structure was formed in the same manner as in Example 1 except that the trapezoidal slit was produced, was measured, and was observed. As a result, a clear superconducting transition was confirmed at around 93K and a transition width of about 1K. The relative critical current value was 1.0.

Example 3

The connection structure of a superconducting layer of the third embodiment illustrated in FIGS. 17A and 17B was formed. Three oxide superconducting wires in which an intermediate layer and a $GdBa_2Cu_3O_{7-\delta}$ layer (oxide superconducting layer) were formed on a Hastelloy base and were covered with a protective layer of silver and copper were prepared. A length of one wire was 1.6 cm, and lengths of the remaining two wires were 10 cm. The entire wire of 1.6 cm between both ends was wet-etched by using a mixed solution of nitric acid, ammonia, and hydrogen peroxide to expose the oxide superconducting layer. Portions of the two wires of 10 cm at 0.8 cm from one end were wet-etched by using a mixed solution of nitric acid, ammonia, and hydrogen peroxide to expose the oxide superconducting layer.

From one end of the wire of 1.6 cm to 0.6 cm, a slit was formed by cutting a portion having a width of 0.05 cm around 0.075 cm from a corner of the end. In addition, from one end of the wire to 0.6 cm, another slit was formed by cutting a portion having a width of 0.05 cm around 0.075 cm from the other corner of the end.

A connection structure was formed in the same manner as in Example 1 except that two slits were produced, was measured, and was observed. As a result, a clear superconducting transition was confirmed at around 93K and a transition width of about 1K. The relative critical current value was 1.0.

Example 4

The connection structure of a superconducting layer of the fourth embodiment illustrated in FIGS. 18A, 18B, and 18C was formed. Three oxide superconducting wires in which an intermediate layer and a $GdBa_2Cu_3O_{7-\delta}$ layer (oxide superconducting layer) were formed on a Hastelloy base and were covered with a protective layer of silver and copper were prepared. A length of one wire was 1.6 cm, and lengths of the remaining two wires were 10 cm. The entire wire of 1.6 cm between both ends was wet-etched by using a mixed solution of nitric acid, ammonia, and hydrogen peroxide to expose the oxide superconducting layer. Portions of the two wires of 10 cm at 0.8 cm from one end were wet-etched by using a mixed solution of nitric acid, ammonia, and hydrogen peroxide to expose the oxide superconducting layer.

A slit having a length of 0.5 cm and a width of 0.1 cm was formed by punching at a position of 0.1 cm from one end of the wire of 1.6 cm. A slit having a length of 0.5 cm and a width of 0.1 cm was further formed by punching at a position of 0.1 cm from the exposed end of one superconducting layer of the wires of 10 cm.

A connection structure was formed in the same manner as in Example 1 except that the slit did not cover the end of the wire, is measured, and is observed. As a result, a clear superconducting transition was confirmed at around 93K and a transition width of about 1K. The relative critical current value was 1.0.

Example 5

The connection structure of a superconducting layer of the fifth embodiment illustrated in FIG. 19 and FIGS. 20A, 20B, and 20C was formed. Two oxide superconducting wires having 10 cm in which an intermediate layer and a GdBa$_2$Cu$_3$O$_{7-\delta}$ layer (oxide superconducting layer) were formed on a Hastelloy base and were covered with a protective layer of silver and copper were prepared. Portions of the two wires at 0.8 cm from one end were wet-etched by using a mixed solution of nitric acid, ammonia, and hydrogen peroxide to expose the oxide superconducting layer.

A slit was formed by cutting a center of one superconducting layer from the exposed end to 0.6 cm by 0.1 cm.

Powders of Gd$_2$O$_3$, BaCO$_3$, and CuO having a particle size of about submicron were prepared, were appropriately weighed, and then were sufficiently mixed using a mortar. Water and sodium alginate were added to the resulting mixed powder to prepare a slurry.

The obtained slurry was applied to the exposed oxide superconducting layer of the wire in which the slit was produced, and then the slurry-applied portion of the wire and the exposed portion of the superconducting layer of the other wire overlapped each other so as to face each other, and were sandwiched between plates from above and below. This structure was inserted in a furnace while being sandwiched between the plates, weights were provided on upper faces of the plates, and a load was applied to the connection portion.

A first heat treatment of heating this structure to 780° C. in the air atmosphere was performed with the weight provided on this structure. Thereafter, the connection structure of the superconducting layers was formed by cooling the heated structure to around a room temperature, introducing oxygen gas into the furnace, and performing a second heat treatment of heating the cooled structure to 500° C. in an oxygen atmosphere.

Terminals were attached to both ends of the connected superconducting wire, and the temperature dependence of the electric resistance was measured. As a result, a clear superconducting transition was confirmed at around 93K and a transition width of about 1K. The relative critical current value was 1.0.

Comparative Example 1

The connection structure of a superconducting layer of the comparative example illustrated in FIGS. 11A, 11B, and 11C was formed. Three oxide superconducting wires in which an intermediate layer and a GdBa$_2$Cu$_3$O$_{7-\delta}$ layer (oxide superconducting layer) were formed on a Hastelloy base and were covered with a protective layer of silver and copper were prepared. A length of one wire was 1.6 cm, and lengths of the remaining two wires were 10 cm. The entire wire of 1.6 cm between both ends was wet-etched by using a mixed solution of nitric acid, ammonia, and hydrogen peroxide to expose the oxide superconducting layer. Portions of the two wires of 10 cm at 0.8 cm from one end were wet-etched by using a mixed solution of nitric acid, ammonia, and hydrogen peroxide to expose the oxide superconducting layer.

Powders of Gd$_2$O$_3$, BaCO$_3$, and CuO having a particle size of about submicron were prepared, were appropriately weighed, and then were sufficiently mixed using a mortar. Water and sodium alginate were added to the resulting mixed powder to prepare a slurry.

The structure illustrated in FIG. 8 was obtained by applying the obtained slurry to the exposed oxide superconducting layer of the wire of 1.6 cm wire, overlapping the slurry-applied portion of the wire of 1.6 cm and the exposed portion of the superconducting layer of the wire of 10 cm each other so as to face each other and sandwiching these portions between plates from above and below. This structure was inserted in a furnace while being sandwiched between the plates, weights were provided on upper faces of the plates, and a load was applied to the connection portion.

A first heat treatment of heating this structure to 780° C. in the air atmosphere was performed with the weight provided on this structure. Thereafter, the connection structure of the superconducting layers was formed by cooling the heated structure to around a room temperature, introducing oxygen gas into the furnace, and performing a second heat treatment of heating the cooled structure to 500° C. in an oxygen atmosphere.

Terminals were attached to both ends of the connected superconducting wire, and the temperature dependence of the electric resistance was measured. As a result, a superconducting transition was confirmed at 93K or less. A change in the electric resistance with respect to a temperature change was gentler than that in Example 1, and the transition width was widened to about 5K. The relative critical current value decreases to 0.7.

When the cross section of the connection portion was observed by SEM and SEM-EDX, segregation of Ba presumed to be carbonic acid Ba remaining in the vicinity of the center of the connection portion was confirmed in a composition of GdBa$_2$Cu$_3$O$_{7-\delta}$.

Example 6

The connection structure of the sixth embodiment illustrated in FIG. 21 and FIGS. 22A and 22B was formed. A reinforcement structure was obtained by forming the connection structure according to the procedure of Example 1 and burying the wire by a length of 2.6 cm including the connection structure in a solder containing silver (Ag) and indium (In).

Terminals were attached to both ends of the reinforced superconducting wire, and the temperature dependence of the electric resistance was measured. As a result of measuring the temperature dependence of the electric resistance, a clear superconducting transition was confirmed at around 93K and a transition width of about 1K. The relative critical current value was 1.0.

While certain embodiments have been described, these embodiments have been presented by way of example only, and are not intended to limit the scope of the inventions. Indeed, the connection structure of a superconducting layer, the superconducting wire, the superconducting coil, and the superconducting device described herein may be embodied in a variety of other forms; furthermore, various omissions, substitutions and changes in the form of the devices and methods described herein may be made without departing from the spirit of the inventions. The accompanying claims and their equivalents are intended to cover such forms or modifications as would fall within the scope and spirit of the inventions.

What is claimed is:

1. A connection structure of a superconducting layer comprising:
   a first superconducting member including a first superconducting layer and a first substrate, the first substrate supporting the first superconducting layer, and the first superconducting member extending in a first direction;
   a second superconducting member including a second superconducting layer and a second substrate, the second superconducting layer facing the first superconducting layer, the second substrate supporting the second superconducting layer, the second superconducting member extending in the first direction, the second superconducting member having a first region, a second region, and a third region, a width of the first region in a second direction perpendicular to the first direction being a first width, a width of the second region in the second direction being a second width, a width of the third region in the second direction is a third width, the third region being separated in the second direction from the second region, the second width being smaller than the first width, the third width being smaller than the first width, an end of the second region in the first direction being in contact with the first region, an end of the third region in the first direction being in contact with the first region; and a connection layer containing a rare earth element (RE), barium (Ba), copper (Cu), and oxygen (O), and the connection layer connecting the first superconducting layer and the second superconducting layer, wherein the first superconducting layer is present in a third direction of a portion between the second region and the third region, the first superconducting layer is not present at the portion, and the third direction is perpendicular to the first direction and perpendicular to the second direction.

2. The connection structure of a superconducting layer according to claim 1, wherein the second superconducting member is not present in a direction opposite to the first direction of the portion between the second region and the third region.

3. The connection structure of a superconducting layer according to claim 1, wherein the connection layer is present in the third direction of the portion between the second region and the third region.

4. The connection structure of a superconducting layer according to claim 1, wherein the second width increases in the first direction, and the third width increases in the first direction.

5. The connection structure of a superconducting layer according to claim 1, wherein a shape of the second superconducting member is line-symmetric with respect to a line segment passing through a center of the second superconducting member in the second direction and parallel to the first direction.

6. The connection structure of a superconducting layer according to claim 1, wherein an area of a portion of the second superconducting member in contact with the connection layer is 50% or more of a product of a distance in the first direction between an end of the second superconducting member in a direction opposite to the first direction and an end of the first superconducting member in the first direction and a width of the second superconducting member in the second direction.

7. The connection structure of a superconducting layer according to claim 1, wherein a distance in the first direction between the end of the second region in the first direction and an end of the first superconducting member in the first direction is smaller than a width of the second superconducting member in the second direction.

8. The connection structure of a superconducting layer according to claim 1, wherein a distance in the first direction between an end of the second region in the first direction and an end of the first superconducting member in the first direction is $\frac{1}{4}$ or more of a width of the second superconducting member in the second direction.

9. The connection structure of a superconducting layer according to claim 1, further comprising:
a reinforcing member provided between the second region and the third region.

10. The connection structure of a superconducting layer according to claim 1, further comprising:

a third superconducting member including a third superconducting layer and a third substrate, the third superconducting layer facing the second superconducting layer, the third substrate supporting the third superconducting layer, the third superconducting member extending in the first direction, the third superconducting member having a fourth region, a fifth region, and a sixth region, a width of the fourth region in the second direction being a fourth width, a width of the fifth region in the second direction being a fifth width, a width of the sixth region in the second direction is a sixth width, the sixth region being separated in the second direction from the fifth region, the fifth width being smaller than the fourth width, the sixth width being smaller than the fourth width, an end of the fifth region in the first direction being in contact with the fourth region, and an end of the sixth region in the first direction being in contact with the fourth region, wherein the connection layer connects the third superconducting layer and the second superconducting layer, and the second superconducting layer is present in a direction opposite to the third direction of a portion between the fifth region and the sixth region.

11. The connection structure of a superconducting layer according to claim 10, wherein the third superconducting member is not present in a direction opposite to the first direction of the portion between the fifth region and the sixth region.

12. The connection structure of a superconducting layer according to claim 10, wherein the connection layer is present in the direction opposite to the third direction of the portion between the fifth region and the sixth region.

13. The connection structure of a superconducting layer according to claim 10, wherein the fifth width increases in the first direction, and the sixth width increases in the first direction.

14. The connection structure of a superconducting layer according to claim 10, wherein a shape of the third superconducting member is line-symmetric with respect to a line segment passing through a center of the third superconducting member in the second direction and parallel to the first direction.

15. The connection structure of a superconducting layer according to claim 10, wherein an area of the third superconducting member in contact with the connection layer is 50% or more of a product of a distance in the first direction between an end of the third superconducting member in a direction opposite to the first direction and an end of the second superconducting member in the first direction and a width of the third superconducting member in the second direction.

16. The connection structure of a superconducting layer according to claim 10, wherein a distance in the first direction between the end of the fifth region in the first direction and an end of the second superconducting member in the first direction is smaller than a width of the third superconducting member in the second direction.

17. The connection structure of a superconducting layer according to claim 10, wherein a distance in the first direction between the end of the fifth region in the first direction and an end of the second superconducting member in the first direction is $\frac{1}{4}$ or more of a width of the third superconducting member in the second direction.

18. The connection structure of a superconducting layer according to claim 10, further comprising:
   a reinforcing member provided between the fifth region and the sixth region.

19. A superconducting wire comprising the connection structure of a superconducting layer according to claim 1.

20. A superconducting coil comprising the superconducting wire according to claim 19.

21. A superconducting device comprising the superconducting coil according to claim 20.

* * * * *